(12) United States Patent
Faulkner et al.

(10) Patent No.: US 11,023,093 B2
(45) Date of Patent: Jun. 1, 2021

(54) HUMAN-COMPUTER INTERFACE FOR COMPUTATIONALLY EFFICIENT PLACEMENT AND SIZING OF VIRTUAL OBJECTS IN A THREE-DIMENSIONAL REPRESENTATION OF A REAL-WORLD ENVIRONMENT

(71) Applicant: MICROSOFT TECHNOLOGY LICENSING, LLC, Redmond, WA (US)

(72) Inventors: Jason Thomas Faulkner, Seattle, WA (US); Sandhya Rajendra Rao, Bellevue, WA (US); Kathleen Patricia Mulcahy, Seattle, WA (US); Timothy David Kviz, Seattle, WA (US); Bogdan Berg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 15/993,519

(22) Filed: May 30, 2018

(65) Prior Publication Data
US 2019/0369836 A1    Dec. 5, 2019

(51) Int. Cl.
*G06F 3/0481* (2013.01)
*G06F 3/0346* (2013.01)
(Continued)

(52) U.S. Cl.
CPC .......... *G06F 3/04815* (2013.01); *G06F 3/013* (2013.01); *G06F 3/04845* (2013.01);
(Continued)

(58) Field of Classification Search
CPC .. G06F 3/04815; G06F 3/013; G06F 3/04845; G06F 3/04883; G06F 3/167;
(Continued)

(56) References Cited

U.S. PATENT DOCUMENTS

| 6,335,731 B1 | 1/2002 | Yamamoto |
| 2006/0136552 A1 | 6/2006 | Krane et al. |

(Continued)

FOREIGN PATENT DOCUMENTS

| EP | 2977961 A1 | 1/2016 |
| WO | 2017027183 A1 | 2/2017 |

OTHER PUBLICATIONS

"International Search Report and Written Opinion Issued in PCT Application No. PCT/US2019/031926", dated Jul. 24, 2019, 12 Pages.

(Continued)

*Primary Examiner* — Jennifer N To
*Assistant Examiner* — Kc Chen
(74) *Attorney, Agent, or Firm* — Newport IP, LLC; Scott Y. Shigeta

(57) ABSTRACT

An improved human-computer interface for placing and sizing virtual objects in a three-dimensional ("3D") representation of a real-world environment is disclosed herein. The disclosed HCI can determine a location, size, and orientation of virtual objects in a 3D representation of a real-world environment based on simplified user gestures. In some embodiments, based on the timing and direction of an input gesture, a computing device can utilize (1) an automated mode that determines a position and orientation of a virtual object or utilize (2) a manual mode that determines position, orientation, and size of the virtual object. A computing device capable of 3D spatial mapping generates mesh data defining a 3D representation of a real-world environment and images of the real-world environment. The size of the virtual object can be based on a computed depth of real-world objects related to the virtual object.

20 Claims, 19 Drawing Sheets

(51) Int. Cl.
  *G06F 3/0338* (2013.01)
  *G06F 3/01* (2006.01)
  *G06T 7/50* (2017.01)
  *G06T 7/70* (2017.01)
  *G06F 3/0484* (2013.01)
  *G06F 3/0488* (2013.01)
  *G06F 3/16* (2006.01)
  *G06T 17/20* (2006.01)
  *G06F 3/0354* (2013.01)
  *G06T 19/00* (2011.01)

(52) U.S. Cl.
  CPC .......... *G06F 3/04883* (2013.01); *G06F 3/167* (2013.01); *G06T 7/50* (2017.01); *G06T 7/70* (2017.01); *G06T 17/20* (2013.01); *G06F 3/03543* (2013.01); *G06T 19/006* (2013.01)

(58) Field of Classification Search
  CPC ...... G06F 3/03543; G06F 3/017; G06F 3/011; G06T 7/50; G06T 7/70; G06T 17/20; G06T 19/006
  See application file for complete search history.

(56) References Cited

U.S. PATENT DOCUMENTS

| | | |
|---|---|---|
| 2009/0089322 A1 | 4/2009 | Naaman |
| 2009/0195656 A1* | 8/2009 | Zhou .................... G09B 19/00 348/169 |
| 2011/0285811 A1* | 11/2011 | Langlotz ............ H04N 5/23238 348/37 |
| 2012/0072420 A1 | 3/2012 | Moganti et al. |
| 2012/0143361 A1 | 6/2012 | Kurabayashi et al. |
| 2014/0002444 A1 | 1/2014 | Bennett et al. |
| 2014/0006967 A1 | 1/2014 | Arumugam et al. |
| 2014/0306993 A1 | 10/2014 | Poulos et al. |
| 2015/0067615 A1* | 3/2015 | Sim .................... G06F 3/04883 715/863 |
| 2015/0254905 A1* | 9/2015 | Ramsby ................ G06T 19/006 345/419 |
| 2016/0246948 A1 | 8/2016 | Xiao |
| 2016/0379409 A1 | 12/2016 | Gavriliuc et al. |
| 2017/0039770 A1 | 2/2017 | Lanier et al. |
| 2017/0061691 A1* | 3/2017 | Scott .................... G06T 19/006 |
| 2018/0121214 A1 | 5/2018 | Faulkner et al. |
| 2019/0236842 A1 | 8/2019 | Bennett et al. |
| 2019/0318510 A1 | 10/2019 | Eronen et al. |
| 2020/0202634 A1 | 6/2020 | Faulkner et al. |

OTHER PUBLICATIONS

"Non-Final Office Action Issued in U.S. Appl. No. 16/228,638", dated Mar. 6, 2020, 17 Pages.

"International Search Report and Written Opinion Issued in PCT Application No. PCT/US19/065572", dated Mar. 4, 2020, 12 Pages.

"Final Office Action Issued in U.S. Appl. No. 16/228,638", dated Aug. 10, 2020, 40 Pages.

* cited by examiner

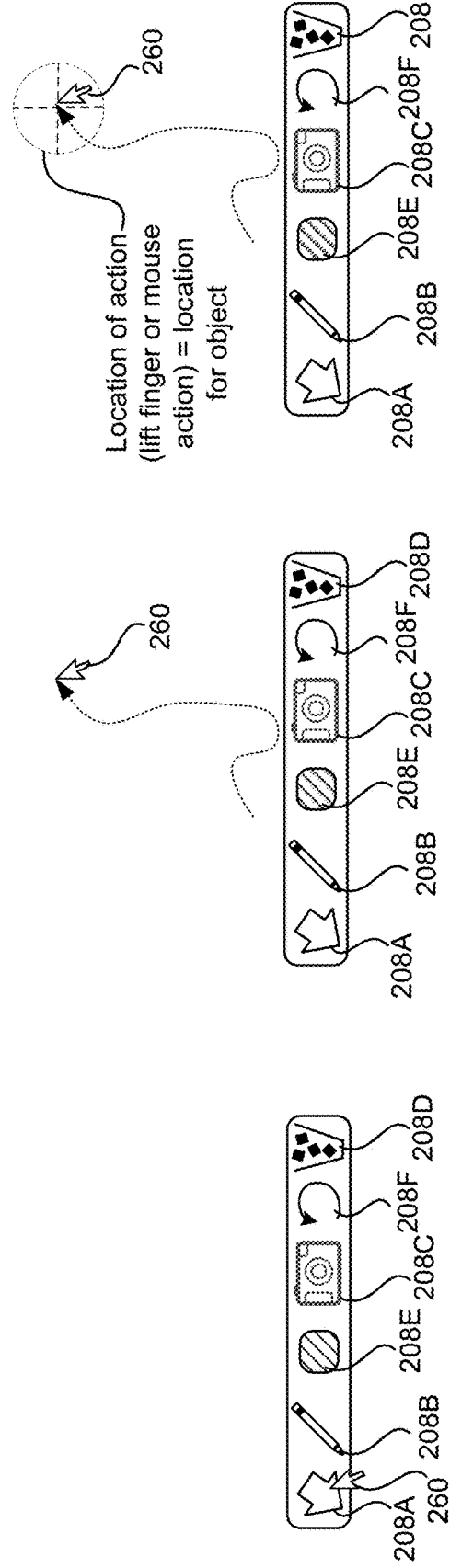
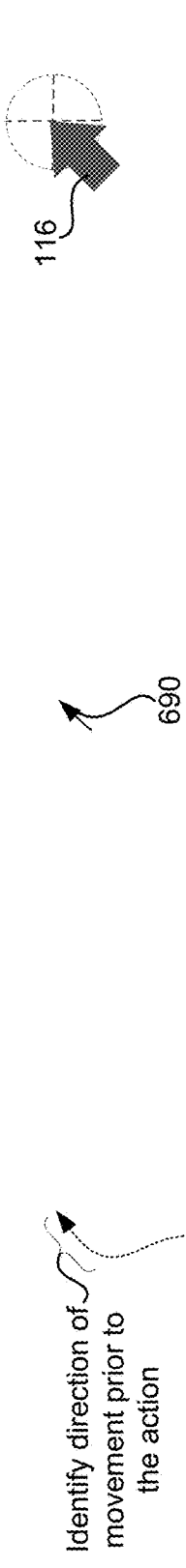
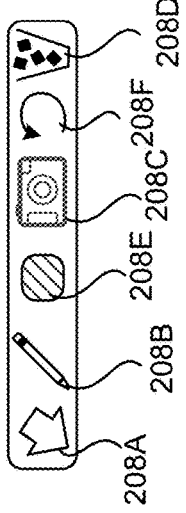
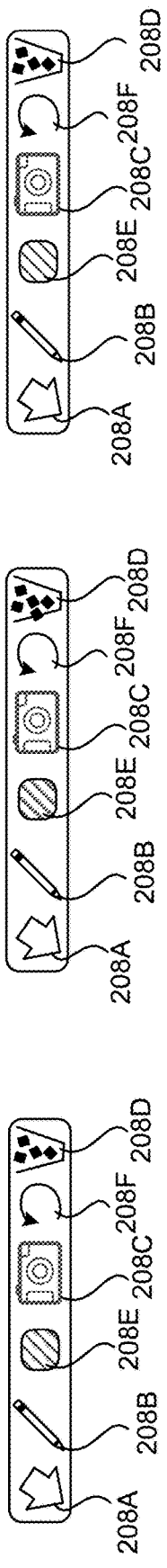

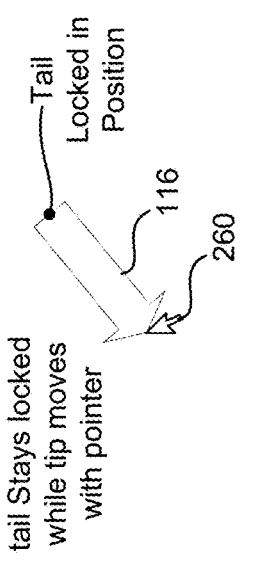
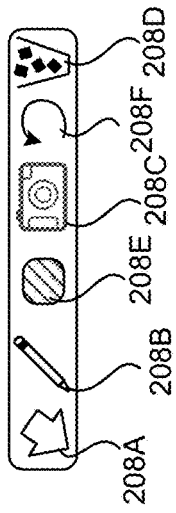
FIG. 8A
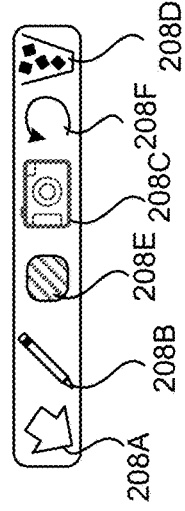
FIG. 8B
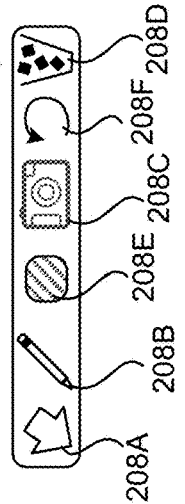
FIG. 8C
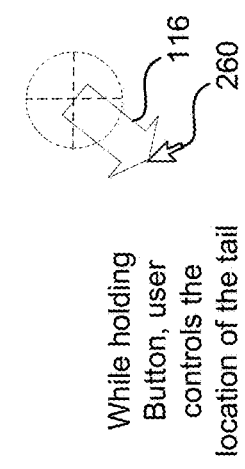
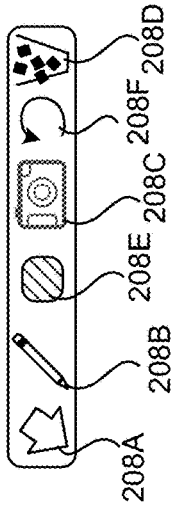
FIG. 8D
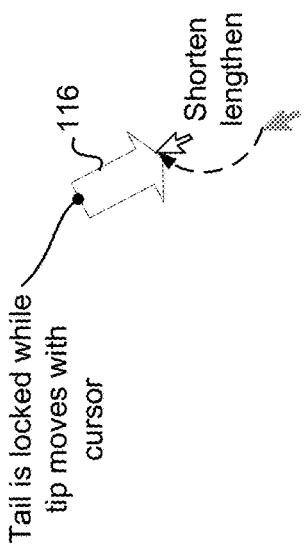
FIG. 8E
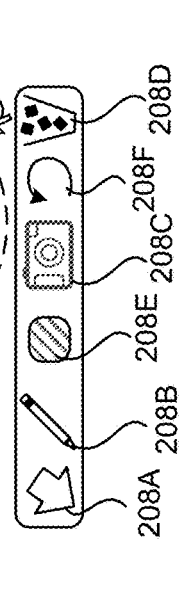
FIG. 8F
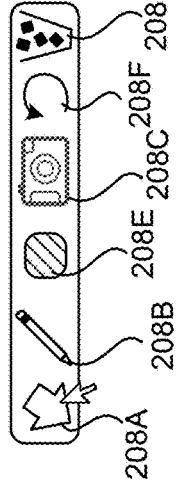
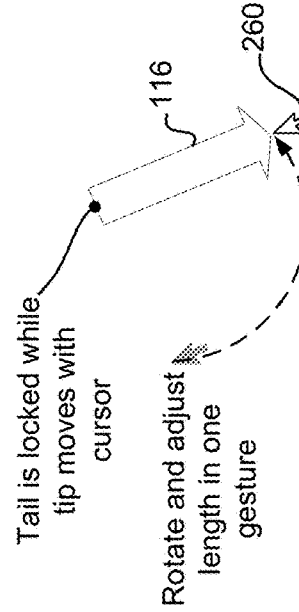

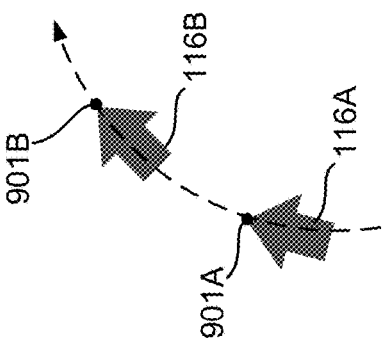
FIG. 9A
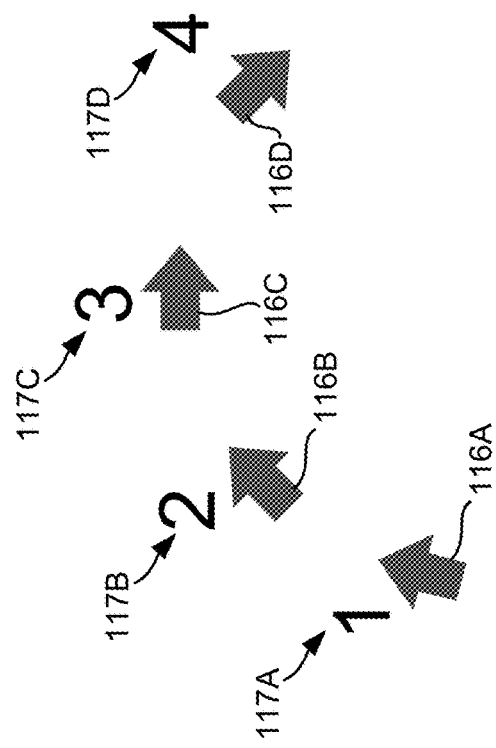
FIG. 9B
FIG. 9D
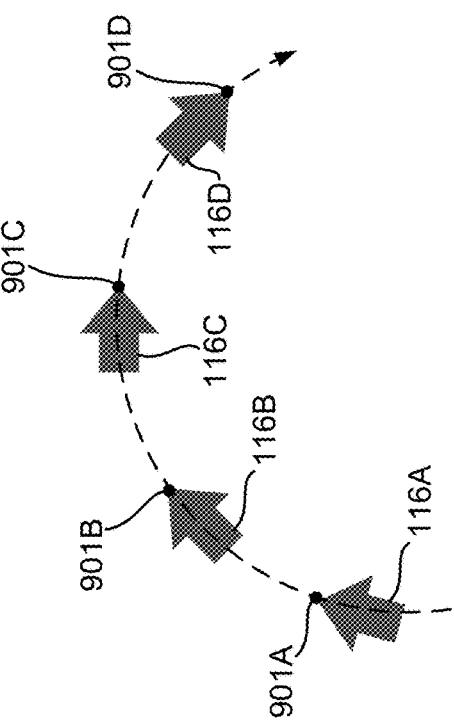
FIG. 9C

HUMAN-COMPUTER INTERFACE FOR COMPUTATIONALLY EFFICIENT PLACEMENT AND SIZING OF VIRTUAL OBJECTS IN A THREE-DIMENSIONAL REPRESENTATION OF A REAL-WORLD ENVIRONMENT

BACKGROUND

A networked meeting represents one popular form of electronic collaboration that facilitates communication between two or more participants present at separate physical locations. Participants of a communication session in a networked meeting are able to exchange live video, audio, and other types of content to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

As networked meetings have become ubiquitous, the types of devices that can be used to participate in networked meetings has increased. While once limited to desktop and laptop computers, users can now participate in networked meetings using many other types of hardware devices including, but not limited to, smartphones, tablet computing devices, set-top boxes, smart televisions, video game systems, and even augmented reality ("AR"), virtual reality ("VR"), and mixed reality ("MR") devices.

When a participant utilizes an AR device to participate in a networked meeting, it is currently possible for the AR device to capture that participant's view of their surrounding environment and transmit images or video of the view to the other meeting participants. The other meeting participants can then be presented with the images or video of the real-world environment surrounding the user wearing the AR device. The other meeting participants might also be able to view any virtual objects that the AR device has overlaid upon the real-world environment.

Despite the benefits of the features described above, some systems do have some drawbacks. For example, some traditional input devices cannot be used for placement and modification of virtual objects displayed within a mixed reality environment or a virtual reality environment. It can be appreciated that there is an ongoing need to improve techniques for allowing users to efficiently interact with objects in such environments. Inefficient interactions between a user and a computing device can lead to an undesirable user experience and, among other inefficiencies with respect to computing resources, production loss.

It is with respect to these considerations and others that the disclosure made herein is presented.

SUMMARY

An improved human-computer interface ("HCI") is disclosed herein for placing and sizing virtual objects in a three-dimensional ("3D") representation of a real-world environment. The disclosed HCI can determine a location, size, and orientation of virtual objects in a 3D representation of a real-world environment based on simplified user gestures. In some embodiments, based on the timing and direction of an input gesture, a computing device can utilize (1) an automated mode that determines a position and orientation of a virtual object or utilize (2) a manual mode that determines position, orientation, and size of the virtual object. The automated mode is invoked in response to a first type of input action, such as a short tap of a mouse button. In response to detecting the first type of input action, a virtual object, such as a tip of an arrow, can be placed at the position of a cursor at the time of the input action. The orientation of the virtual object is determined by the direction of the movement of an input device immediately prior to the input action. The size of the virtual object can correspond to a distance between a real-world object and one or more sensors.

The manual mode is invoked in response to a second type of input action, such as a press and hold action. In response to detecting the second type of input action, a first point of the virtual object, such as an arrow, is placed at the position of the input action. During the press and hold action, the first point of the virtual object is locked at the position, the size and orientation of the virtual object are manipulated by the movement of cursor. In response to detecting a subsequent input action, such as a release action, a second point of the virtual object, such as the tail of the arrow, is placed at the position of the cursor at the time of the subsequent input action.

The HCI disclosed herein can enable users to efficiently place, size, rotate, and otherwise modify virtual objects in a 3D representation of a real-world environment. This can also result in more efficient use of computing resources such as processor cycles, memory, network bandwidth, and power, as compared to previous solutions. Other technical benefits not specifically mentioned herein can also be realized through implementations of the disclosed subject matter.

In order to realize the technical benefits mentioned briefly above, and potentially others, a computing device configured with sensors and program code capable of 3D spatial mapping, such as an AR device or appropriately-configured smartphone, generates mesh data that defines a 3D representation of a real-world environment. The computing device also generates still or moving images (i.e. a video) of the real-world environment. Such a computing device can also be utilized to augment a user's view of the real-world environment with virtual objects. The virtual objects appear as if they are actually present in the real-world environment when the real-world environment is viewed with the computing device. The computing device transmits the mesh data and images to a remote computing device over a suitable data communications network.

The remote computing device executes an application program, or another type of program, that is configured to enable networked meetings, such as those described briefly above. The application program receives the mesh data and images generated by the computing device (e.g. a AR device) and renders the images in a user interface ("UI"). In this manner, a user of the remote computing device can see the view of the real-world environment as seen by the user of the computing device along with any virtual objects augmenting that view.

The configurations disclosed herein improve a user's interaction with the computing device. In particular, this invention enables users to indicate a position and a direction of an object in a 2D or 3D computing environment using simplified gestures. In some configurations, the application program can also receive user input (e.g. mouse or touch input) via the UI that defines a location on the images at which a virtual object is to be placed within the 3D representation of the real-world environment defined by the mesh data. For example, a user might utilize the UI to place an arrow-shaped virtual object at a location pointing to a real-world object or a second virtual object in order to bring attention to the real-world or virtual object. Other types of virtual objects can be placed in a similar manner.

In some configurations, responsive to receiving an input for placing a virtual object, the application program can utilize the mesh data to determine the depth of the specified location within the 3D representation of the real-world environment. The application program can then determine the size at which the virtual object is to be rendered in the UI based upon the computed depth. For instance, virtual objects nearer to a user's viewpoint into the 3D representation of the real-world environment can be rendered larger than those virtual objects that are further away.

In some embodiments, the depth of the location within the 3D representation of the real-world environment corresponds to the depth of a real-world object at the specified location in the real-world environment. In this manner, virtual objects can be located at the same depth in the 3D representation of the real-world environment as real-world objects. The depth of the location within the 3D representation of the real-world environment might alternately correspond to the depth of another virtual object already present in the 3D representation of the real-world environment. In this manner, a user can define virtual objects located at the same depth in the 3D representation of the real-world environment as other virtual objects.

Once the size of the virtual object has been computed, the remote computing device can render the virtual object in the UI at the location within the 3D representation of the real-world environment. In this manner, the virtual object appears as if it were actually present in the real-world environment. The mesh data can be updated and provided to the computing device (e.g. an AR device) so that the user of the device can view the new virtual object as if were actually present in the real-world environment. The updated mesh data can also be provided to other participants in the networked meeting for display on their computing devices.

In some scenarios, the real-world object at the location in the real-world environment is planar such as, for instance, a wall or a whiteboard. In these scenarios, the virtual object can be rendered in the same plane as the real-world object. In this manner, both the size of the virtual object and its orientation can be defined such that the virtual object appears in perspective when rendered by the remote computing device.

In some embodiments, the virtual object is fixed at the location specified within the 3D representation of the real-world environment. In this manner, the virtual objects remain in their specified location even when a user of the computing device moves their head or otherwise changes position. Additionally, in some embodiments the UI further includes one or more UI controls for manipulating the virtual object. For example, and without limitation, the UI controls can provide functionality for rotating, coloring, transforming, deleting, replacing, or otherwise modifying the visual appearance of the virtual object.

It should be appreciated that various aspects of the subject matter described briefly above and in further detail below can be implemented as a hardware device, a computer-implemented method, a computer-controlled apparatus or device, a computing system, or an article of manufacture, such as a computer storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those specifically described herein, including multiprocessor systems, microprocessor-based or programmable consumer electronics, AR, VR, and MR devices, video game devices, handheld computers, smartphones, smart televisions, self-driving vehicles, smart watches, e-readers, tablet computing devices, special-purpose hardware devices, network appliances, and the others.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

FIG. 6A is a UI diagram showing a selection process for invoking a computationally efficient placement and orientation of a virtual object in a 3D representation of a real-world environment.

FIG. 6B is a UI diagram showing the movement of an input gesture used for computationally efficient placement and orientation of a virtual object in a 3D representation of a real-world environment.

FIG. 6C is a UI diagram showing the location of the virtual object placed in response to an input gesture.

FIG. 6D is a UI diagram showing how the movement pattern of an input gesture can be used to identify an orientation for a virtual object.

FIG. 6E is a UI diagram showing a vector that is determined from the movement pattern of the pointing device.

FIG. 6F is a UI diagram showing the generation and rendering of a virtual object base on the movement pattern of the pointing device.

FIG. 8A is a UI diagram showing a location that is determined for placement of a virtual object based on an input action.

FIG. 8B is a UI that illustrates how the virtual object shown in FIG. 8A can be generated based on the input gesture.

FIG. 8C is a UI that illustrates how the virtual object shown in FIG. 8A can be resized and rotated in a clockwise direction based on the input gesture.

FIG. 8D is a UI that illustrates how the virtual object shown in FIG. 8A can be resized and rotated in a counter-clockwise direction based on the input gesture.

FIG. 8E is a UI that illustrates how the virtual object shown in FIG. 8A can be resized to a smaller size based on the input gesture.

FIG. 8F is a UI diagram showing a full rendering of the virtual object that is positioned and oriented based on the input gesture.

FIG. 9A is a UI diagram showing the start of an input gesture for placing a plurality of virtual objects.

FIG. 9B is a UI diagram showing the continuation of the input gesture shown in FIG. 9A for placing a plurality of virtual objects.

FIG. 9C is a UI diagram showing the continuation of the input gesture shown in FIG. 9B for placing a plurality of virtual objects.

FIG. 9D is a UI diagram showing the plurality of virtual objects placed by a user gesture shown in FIG. 9A through FIG. 9C.

DETAILED DESCRIPTION

Figure 1:
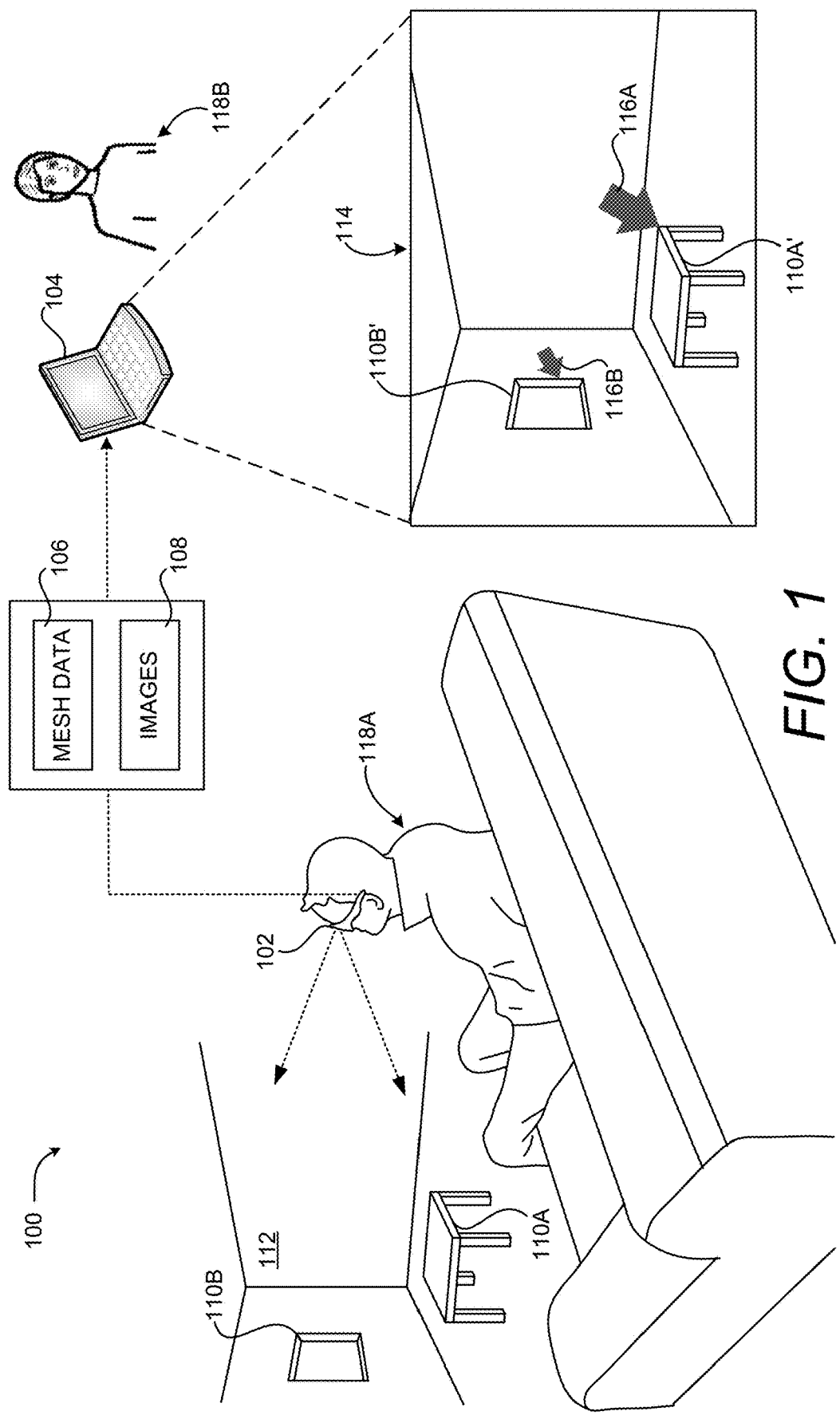
FIG. 1 is a computing system diagram illustrating aspects of an operating environment for the embodiments disclosed herein along with aspects of an illustrative HCI that enables computationally efficient placement and sizing of virtual objects in a 3D representation of a real-world environment, according to one embodiment disclosed herein.

The following Detailed Description describes an improved HCI for placing and sizing virtual objects in a 3D representation of a real-world environment. As mentioned above, the disclosed HCI can automatically size virtual objects in a 3D representation of a real-world environment such that the size of the objects corresponds to their depth in the 3D representation. This enables users to quickly place virtual objects at a desired location in the 3D representation of the real-world environment and have those virtual objects automatically sized such that they appear in perspective to the user. This can result in more efficient use of computing resources such as processor cycles, memory, network bandwidth, and power, as compared to previous solutions relying upon inefficient manual placement of virtual objects at a proper depth in a 3D environment. Technical benefits other than those specifically described herein might also be realized through implementations of the disclosed technologies.

As discussed briefly above, a networked meeting represents one popular form of electronic collaboration that utilizes an application program (e.g., CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS and TEAMS provided by MICROSOFT CORPORATION, of Redmond, Wash.) to facilitate communication between two or more participants present at separate physical locations. As also discussed briefly above, participants of a communication session in a networked meeting are able to exchange live video, audio, and other types of content to view, hear, and otherwise share information. Participants can also view a common space, e.g., a whiteboard or a shared application, through which ideas can be exchanged. Viewing of the common space can be complemented with a video and audio conference, an instant messaging session, or any combination thereof, such that the networked meeting can act as a near substitute for an in-person meeting.

Various types of computing devices can be utilized to participate in networked meetings including, but not limited to, smartphones, tablet computing devices, set-top boxes, smart televisions, video game systems, and even AR, VR, and MR devices. When a participant utilizes an AR device to participate in a networked meeting, the AR device might capture that participant's view of their surrounding environment and transmit images or video of the view to the other meeting participants. The other meeting participants might then be presented with the images or video of the real-world environment surrounding the user wearing the AR device. The other meeting participants might also be able to view any virtual objects that the AR device has overlaid upon the real-world environment.

While meeting participants can view the real-world environment surrounding the user of an AR device and any virtual objects augmenting the user's view of the real-world environment, HCIs for allowing users to interact with, place, size, rotate, and otherwise modify such virtual objects have heretofore been very primitive. As a result, users often struggle to manually place and modify such virtual objects, which can result in inefficient use of computing resources such as, but not limited to, processor cycles, memory, network bandwidth, and power. Moreover, even when a user has successfully placed a virtual object in such an environment, the virtual object can be rendered in a manner that is confusing to the user. This can result in the user spending more time attempting to manually correct the size or placement of a new virtual object or to reorient an existing virtual object, which can also result in inefficient and unnecessary use of computing resources such as, but not limited to, processor cycles, memory, network bandwidth, and power. The disclosed HCI addresses the technical considerations set forth above, and potentially others, and thereby provides technical benefits to computing systems implementing the disclosed technologies.

Turning now to the figures (which might be referred to herein as a "FIG." or "FIGS."), additional details will be provided regarding an improved HCI disclosed herein with reference to the accompanying drawings that form a part hereof. The FIGS. show, by way of illustration, specific configurations or examples. Like numerals represent like or similar elements throughout the FIGS. In the FIGS., the left-most digit(s) of a reference number generally identifies the figure in which the reference number first appears. References made to individual items of a plurality of items can use a reference number with another number included within a parenthetical (and/or a letter without a parenthetical) to refer to each individual item. Generic references to the items might use the specific reference number without the sequence of letters. The drawings are not drawn to scale.

FIG. 1 is a computing system diagram illustrating aspects of an operating environment for the embodiments disclosed herein along with aspects of a HCI capable of enabling computationally efficient placement and sizing of virtual objects in a 3D representation of a real-world environment, according to one embodiment disclosed herein. As shown in FIG. 1, a system 100 disclosed herein utilizes a computing device 102 in some embodiments. The computing device 102, alone or in combination with one or more other devices (e.g. a local computer or one or more remote computing devices 104), might form a system 100 that performs or otherwise implements the various processes and techniques described herein.

In the configuration shown in FIGS., the computing device 102 takes the form of a wearable, head-mounted display device that is worn by a user. It will be understood, however, that the computing device 102 might take a variety of different forms other than the specific configurations depicted in the FIGS. Although the configurations disclosed herein are discussed primarily in the context of AR devices, it is to be appreciated that the technologies disclosed herein can also be utilized with other types of devices that include functionality for spatial mapping such as, but not limited to, appropriately configured VR devices, MR devices smartphones, and tablet computing devices.

The computing device 102 is configured with sensors, other hardware, and program code capable of 3D spatial mapping, such as an AR device or appropriately-configured smartphone, that generates mesh data 106. The mesh data 106 defines a 3D representation of a real-world environment 112, including any physical objects 110 in the real-world environment 112. Examples of mesh data 106 include, but are not limited to, a 3D depth map. The computing device 102 can also capture audio present in the real-world environment 112, such as speech of the user 118A. The computing device 102 also generates still or moving images 108 (i.e. a video) of the real-world environment 112. The terms "image" or "images," as used herein, encompass both still images and moving images, such as digital video.

The computing device 102 includes one or more display panels (not shown in FIG. 1) that display computer generated ("CG") graphics. For example, the computing device 102 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user and provide both right-eye and left-eye viewing via right-eye and left-eye viewing regions of the unitary display panel. In each of these implementations, the ability of the computing device 102 to separately display different right-eye and left-eye graphical content via right-eye and left-eye displays might be used to provide a user 118A of the computing device 102 with a stereoscopic viewing experience.

The computing device 102 might include a variety of on-board sensors. For example, and without limitation, a sensor subsystem (not shown in FIG. 1) might include one or more outward facing optical cameras (e.g., cameras located on an external surface of the computing device 102 and forward facing in a viewing direction of the user 118A), such as an optical camera. The computing device 102 can also include one or more inward facing optical cameras (also not shown in FIG. 1) (e.g., rearward facing toward the user 118A and/or toward one or both eyes of the user 118A).

The computing device 102 can also include a variety of other sensors (not shown in FIG. 1) including, but not limited to, accelerometers, gyroscopes, magnetometers, environment understanding cameras, depth cameras, inward or outward facing video cameras, microphones, ambient light sensors, and potentially other types of sensors. Data obtained by the sensors can be utilized to detect the location, orientation (which might be referred to as a "pose"), and movement of the computing device 102.

The one or more outward facing optical cameras of the computing device 102 can be configured to observe the real-world environment 112 and output images 108 illustrating the real-world environment 112 observed by a user 118A of the computing device 102. The optical cameras are red-green-blue ("RGB") cameras and infrared cameras in one embodiment. It is to be appreciated, however, that other types of cameras can be utilized in other configurations such as, but not limited to, black and white ("B&W") cameras. Additionally, and as mentioned above, the same or different cameras can be utilized for tracking motion of the head of the user 118A (i.e. "head tracking).

The computing device 102 might also include a processing subsystem (not shown in FIG. 1) that includes one or more processor devices that perform at least some of the processes and operations described herein, as defined by instructions executed by the processing subsystem. Such processes or operations might include generating and providing image signals to the display panels, receiving sensory signals from sensors such as cameras, enacting control strategies and procedures responsive to those sensory signals, generating the mesh data 106, and transmitting the mesh data 106 to one or more remote computing devices 104. Other computing systems, such as local or remote computing devices 104 might also perform some of the computational tasks disclosed herein.

The computing device 102 might also include an on-board data storage subsystem (not shown in FIG. 1) that includes one or more memory devices storing computer-executable instructions (e.g., software and/or firmware) executable by the processing subsystem and might additionally hold other suitable types of data. The computing device 102 might also include a communications subsystem supporting wired and/or wireless communications with remote devices (i.e., off-board devices) over a communications network (not shown in FIG. 1). As an example, the communication subsystem of the computing device 102 might be configured to wirelessly send or receive mesh data 106, images 108, digital audio, and/or other information to and from the remote computing device 104.

The computing device 102 can also be utilized to augment a user's view of the real-world environment 112 with virtual objects 116. The virtual objects 116 appear as if they are actually present in the real-world environment 112 when the real-world environment 112 is viewed with the computing device 102. Additional details regarding the configuration and operation of an illustrative computing device 102 will be provided below with regard to FIG. 11.

As described briefly above, the computing device 102 interacts with a remote computing device 104 in some embodiments. The remote computing device 104 may be a personal computer, a wearable computer, including a HMD, or any other type of computing device having components for causing a display of one or more images on a display, such as the illustrative graphical user interface ("UI") 114.

The remote computing device 104 executes an application program, or another type of program, that is configured to enable networked meetings, such as those described above. As also described briefly above, networked meetings can provide various types of communications sessions that enable participants, such as the user 118A and a user 118B of the remote computing device 104 to share information. Such communications sessions can include, but are not limited to, a broadcast session (i.e. one participant to many), a conference session (i.e. many participants to many participants), or a peer-to-peer session (i.e. one participant to one other participant). Additional details regarding one illustrative UI for participating in a networked meeting will be provided below with regard to FIGS. 5A-5C.

The remote computing device 104 also receives the mesh data 106 and images 108 generated by the computing device 102 and renders the images 108 in the UI 114. In this manner, a user 118B of the remote computing device can see the view of the real-world environment 112 as seen by the user 118A of the computing device 102 along with any virtual objects 116 augmenting that view in the UI 114. It should be appreciated that, although not illustrated in FIG. 1, various network devices and connections can be utilized to enable data communications between the computing device 102 and the remote computing device 104.

The application program executing on the remote computing device 104 can also receive user input (e.g. mouse or touch input) from the user 118B via the UI 114 that defines a location on the displayed images 108 at which a virtual object 116 is to be placed within the 3D representation of the real-world environment 112 defined by the mesh data 106. In the example shown in FIG. 1, for instance, the user 118B has utilized the UI 114 to place an arrow-shaped virtual object 116A that points to a rendering of a real-world object 110A' (i.e. the real-world object 110A (a table)). The user 118B has also utilized the UI 114 to place an arrow-shaped virtual object 116B that points to a rendering of a real-world object 110A' (i.e. the real-world object 110A (a window)).

Although not illustrated in FIG. 1, the user 118B can also place virtual objects 116 in association with other virtual objects 116. In this manner, the user 118B can bring attention to a real-world object 110 or a virtual object 116. Other types and shapes of two-dimensional ("2D") and 3D virtual objects 116 can be placed in a similar manner. One illustrative UI 114 for placing virtual objects 116 is described below with reference to FIGS. 5A-5C.

When a user 118B places a virtual object 116 on the rendering of the images 108, the application program executing on the computing device 104 utilizes the mesh data 106 to determine the depth of the location specified by the user 118B within the 3D representation of the real-world environment 112. For example, and without limitation, the computing device 104 can determine the depth of the specified location on the z-axis of the depth map defined by the mesh data 106.

The application program executing on the remote computing device 104 can then determine the size at which the virtual object 116 is to be rendered in the UI 114 based upon the computed depth. For instance, virtual objects 116 nearer to a user's viewpoint into the 3D representation of the real-world environment 112 can be rendered larger than those virtual objects 116 that appear further away from the user.

In some embodiments, the depth of the location within the 3D representation of the real-world environment 112 corresponds to the depth of a real-world object 110 at the specified location in the real-world environment 112. In this manner, virtual objects 116 can be located at the same depth in the 3D representation of the real-world environment 112 as real-world objects 110. In the example shown in FIG. 1, for instance, the virtual object 116A has been placed at the same depth as the real-world object 110A. Similarly, the virtual object 116B has been placed at the same depth as the real-world object 110B. As a result, the virtual object 116A appears larger than the virtual object 116B because the real-world object 110A is closer to the user 118A than the real-world object 110B.

The depth of the location within the 3D representation of the real-world environment 112 might alternately correspond to the depth of another virtual object 116 in the 3D representation of the real-world environment 112. In this manner, a user 118B can define virtual objects 116 located at the same depth in the 3D representation of the real-world environment 112 as other virtual objects 116. Additional details regarding this aspect will be provided below with regard to FIGS. 3A and 3B.

Once the size of the virtual object 116 to be placed has been computed, the remote computing device 104 can render the virtual object 116 in the UI 114 at the computing size and at the specified location within the 3D representation of the real-world environment 112. In this manner, the virtual object 116 appears as if it were actually present in the real-world environment 112. Moreover, using the mechanism described above, users can more quickly place virtual objects 116 at desired locations in a 3D representation of a real-world environment 112 and have those virtual objects 116 automatically sized such that they appear in perspective to the user 118B. This can result in more efficient use of computing resources such as processor cycles, memory, network bandwidth, and power, as compared to previous solutions relying upon inefficient manual placement of virtual objects 116 at a proper depth in a 3D environment.

The computing device 104 can also update the mesh data 106 to include the newly-placed virtual object 116 and provide the updated mesh data 106 to the computing device 102 so that the user 118A of the computing device 102 can view the newly-placed virtual object 116 as if were actually present in the real-world environment 112. In the example shown in FIG. 1, for instance, the virtual objects 116A and 116B appear to the user 118A as if they were actually present in the real-world environment 112. The updated mesh data 106 can also be provided to the computing devices of other participants in the networked meeting for display. Similarly, the updated mesh data 106 can be provided to a server computer (not shown in FIG. 1) for provision to other computing devices 102 and 104.

In some scenarios, the real-world object 110 at the specified location in the real-world environment 112 is planar such as, for instance, a wall, a whiteboard, or the window shown in FIG. 1. In these scenarios, a virtual object 116 can be transformed and rendered in the same plane as the real-world object 110. In this manner, both the size of the virtual object 116 and its orientation in 3D space can be defined such that the virtual object 116 appears in perspective when rendered by the remote computing device 102 and viewed by the user 118A.

The computing device 104 can also modify visual attributes of virtual objects 116 based upon their location within the 3D representation of the real-world environment 112. For example, and without limitation, the brightness or color of virtual objects 116 can be modified based on their depth in the 3D representation of the real-world environment 112. This can make virtual objects 116 that are deeper in the 3D representation to appear darker than those that are closer to a user's 118A viewpoint.

Visual attributes of virtual objects 116 can also be modified as the ambient lighting in the real-world environment 112 changes. For example, the intensity of virtual objects 116 might be reduced as the real-world environment 112 darkens. The virtual objects 116 might also be rendered with shadows depending upon the location of a light source within the real-world environment.

In some embodiments, the virtual object 116 is fixed at the location specified within the 3D representation of the real-world environment 112. In this manner, the virtual objects 116 remain in their specified location even when a user 118A of the computing device 102 moves their head or otherwise changes position. Additional details regarding this aspect will be provided below with regard to FIG. 2C.

In some embodiments the UI 114 further includes one or more UI controls (not shown in FIG. 1) for manipulating virtual objects 116. For example, and without limitation, the UI controls can provide functionality for rotating, coloring, transforming, deleting, replacing, or otherwise modifying the visual appearance of a virtual object 116. Additional details regarding this aspect will be provided below with regard to FIGS. 5A-5C.

Figure 2A:
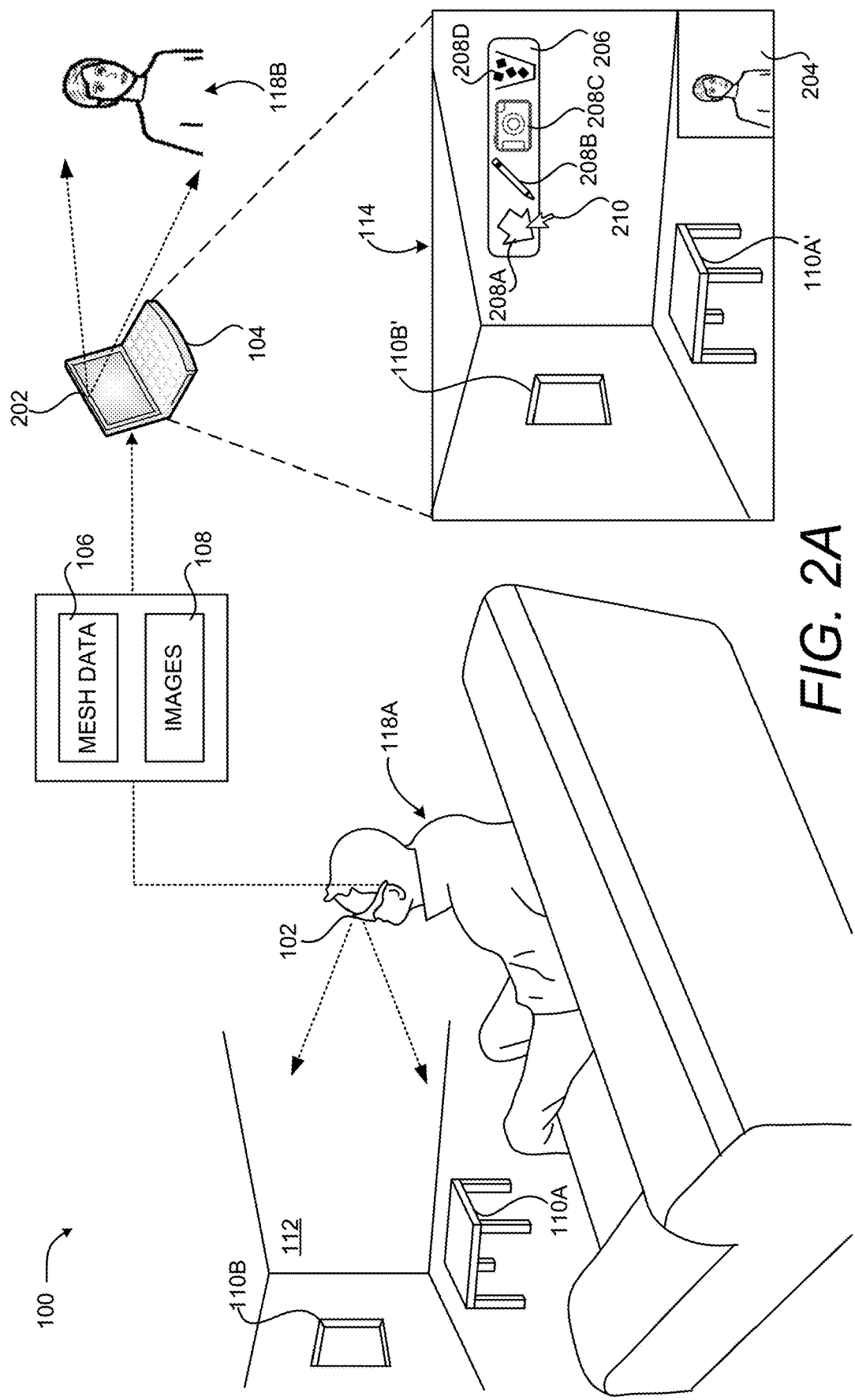
FIG. 2A is a computing system diagram illustrating additional aspects of the illustrative HCI shown in FIG. 1, according to one embodiment disclosed herein.
Figure 2B:
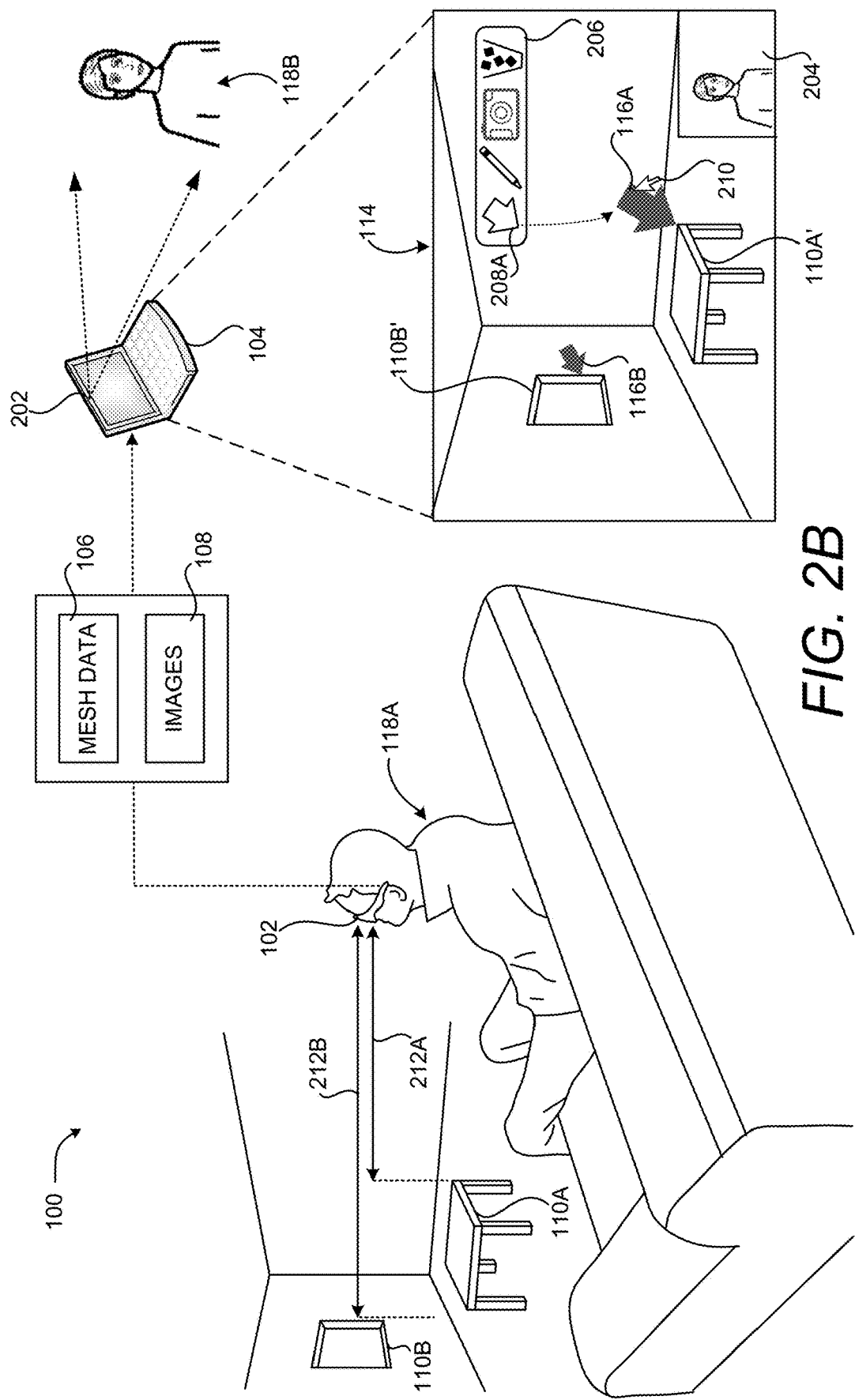
FIG. 2B is a computing system diagram showing additional aspects of the illustrative HCI shown in FIGS. 1 and 2A.
Figure 2C:
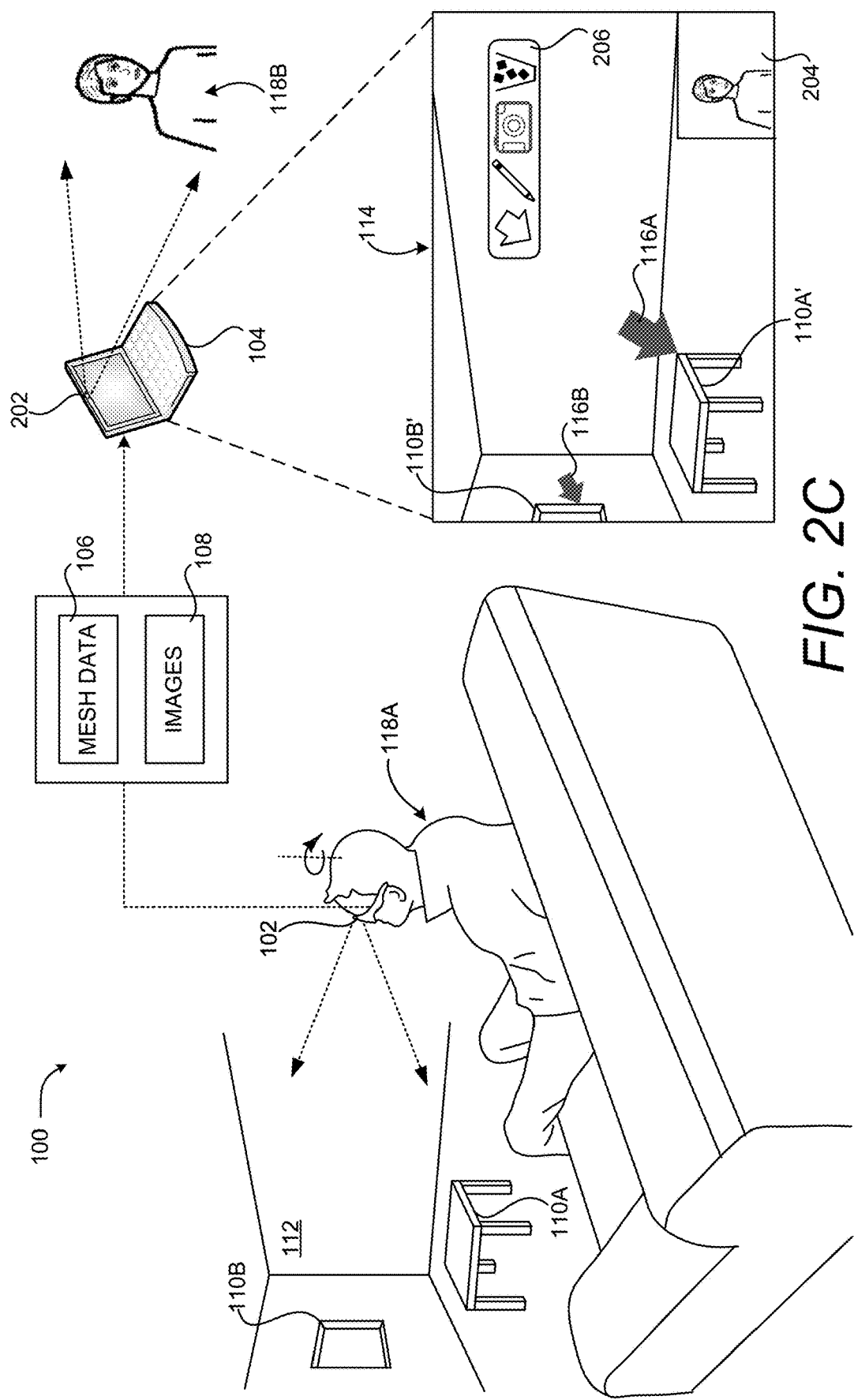
FIG. 2C is a computing system diagram illustrating additional aspects of the illustrative HCI shown in FIGS. 1, 2A, and 2B, according to one embodiment disclosed herein.

FIGS. 2A-2C are computing system diagrams showing additional aspects of the illustrative HCI described above with reference to FIG. 1, according to one embodiment disclosed herein. As shown in FIG. 2A, the remote computing device 104 can be equipped with an imaging sensor 202, like a video camera, in some embodiments. The imaging sensor 202 faces the user 118B and captures images 108 of the user 118B. A rendering 204 of the images 108 of the user 118B on the remote computing device 104 can be displayed in the UI 114. In this manner, a user 118B can see themselves during a networked conference.

As shown in FIG. 2A, the UI 114 also includes a UI 206 containing UI controls 208 in some embodiments which, when selected, enable the placement, modification, or deletion of content on the images 108. The UI control 208A enables a user 118B to place a virtual object 116, in this example an arrow, on the rendering of the images 108. The UI control 208B enables a user 118B to draw on the rendering of the images 108. The UI control 208C enables a user to place a digital picture over the rendering of the images 108. The UI control 208D enables a user to delete a previously-placed virtual object 116, a drawing, or picture. Other UI controls 208 can be provided in other embodiments, some of which are described below with regard to FIGS. 5A-5C.

As discussed briefly above, a user 118B can interact with the UI 206 utilizing mouse input, touch input, or other types of input. In the example shown in FIG. 2A, for instance, the user 118B has moved a mouse cursor 210 over the UI control 208A in order to initiate the placement of a virtual object 116. As shown in FIG. 2B, the user 118B has clicked on the UI control 208A and dragged toward the rendering of the real-world object 110A'. When the user 118B releases the mouse button, the virtual object 116A is placed at the specified location. Details regarding one specific HCI for placing and positioning virtual objects 116 is described below with regard to FIGS. 6A-6C.

In one embodiment, the rendering of the real-world environment 112 shown in the UI 114 is paused while the user 118B is placing a virtual object 116. By pausing the rendering of the real-world environment 112, the user 118B can more easily place a virtual object 116 on the images 108. Once the virtual object 116 has been placed, the rendering of the real-world environment 112 can resume. In other embodiments, the rendering of the real-world environment 112 shown in the UI 114 is not paused while the user 118B is placing a virtual object 116.

As discussed briefly above, when a user 118B places a virtual object 116 on the rendering of the images 108, the application program executing on the computing device 104 utilizes the mesh data 106 to determine the depth of the location specified by the user 118B within the 3D representation of the real-world environment 112. In one embodiment, the depth of a new virtual object 116 is the same as the depth of a real-world object 110 or a virtual object 116 that exists at the specified location for the new virtual object 116.

In the example shown in FIG. 2B, for instance, the remote computing device 104 can determine the location for the virtual object 116A based upon the location of the real-world object 110A in 3D space. The computing device can also calculate the distance 212A from the computing device 102 to the real-world object 110A (i.e. the table) using the mesh data 106. This distance can be utilized to size the virtual object 116A. Similarly, the remote computing device 104 can determine the depth of the virtual object 116B based upon the depth of the real-world object 110B (i.e. the window). The remote computing device 104 can then calculate the distance 212B from the computing device 102 to the real-world object 110B using the mesh data 106. This distance is utilized to size the virtual object 116B.

Because the depth 212B is greater than the depth 212A, the size of the virtual object 116A is greater than the size of the virtual object 116B when rendered in the UI 114. In this manner, virtual objects 116 nearer to a user's viewpoint into the 3D representation of the real-world environment 112 can be rendered larger than those virtual objects 116 that appear further away from the user 118A.

Once the size of the virtual object 116 to be placed has been computed, the remote computing device 104 can render the virtual object 116 in the UI 114 at the computed size and at the specified location within the 3D representation of the real-world environment 112. In this manner, the virtual object 116 appears as if it were actually present in the real-world environment 112.

The computing device 104 can also update the mesh data 106 to include the newly-placed virtual object 116 and provide the updated mesh data 106 to the computing device 102 so that the user 118A of the computing device 102 can view the newly-placed virtual object 116 as if were actually present in the real-world environment 112. In the example shown in FIG. 1, for instance, the virtual objects 116A and 116B appear to the user 118A as if they were actually present in the real-world environment 112.

The updated mesh data 106 can also be provided to the remote computing devices 104 of other participants in the networked meeting for display. Similarly, the updated mesh data 106 can be provided to a server computer (not shown in FIG. 1) for storage and distribution to other computing devices 102 and 104.

As discussed above, the virtual object 116 is fixed, or "pinned," at the location specified within the 3D representation of the real-world environment 112 in some embodiments. In this manner, virtual objects 116 remain in their specified location with respect to real-world and virtual objects even when a user 118A of the computing device 102 moves their head or otherwise changes position.

In the example shown in FIG. 2C, for instance, the user 118A has rotated their head clockwise and, as a result, their view of the real-world environment 112 has changed. Consequently, the rendering of the real-world environment 112 shown in the UI 114 has changed accordingly. However, the locations of the virtual objects 116A and 116B have not changed relative to the locations of the rendered real-world objects 110A' and 110B' to which they are pinned.

Figure 3A:
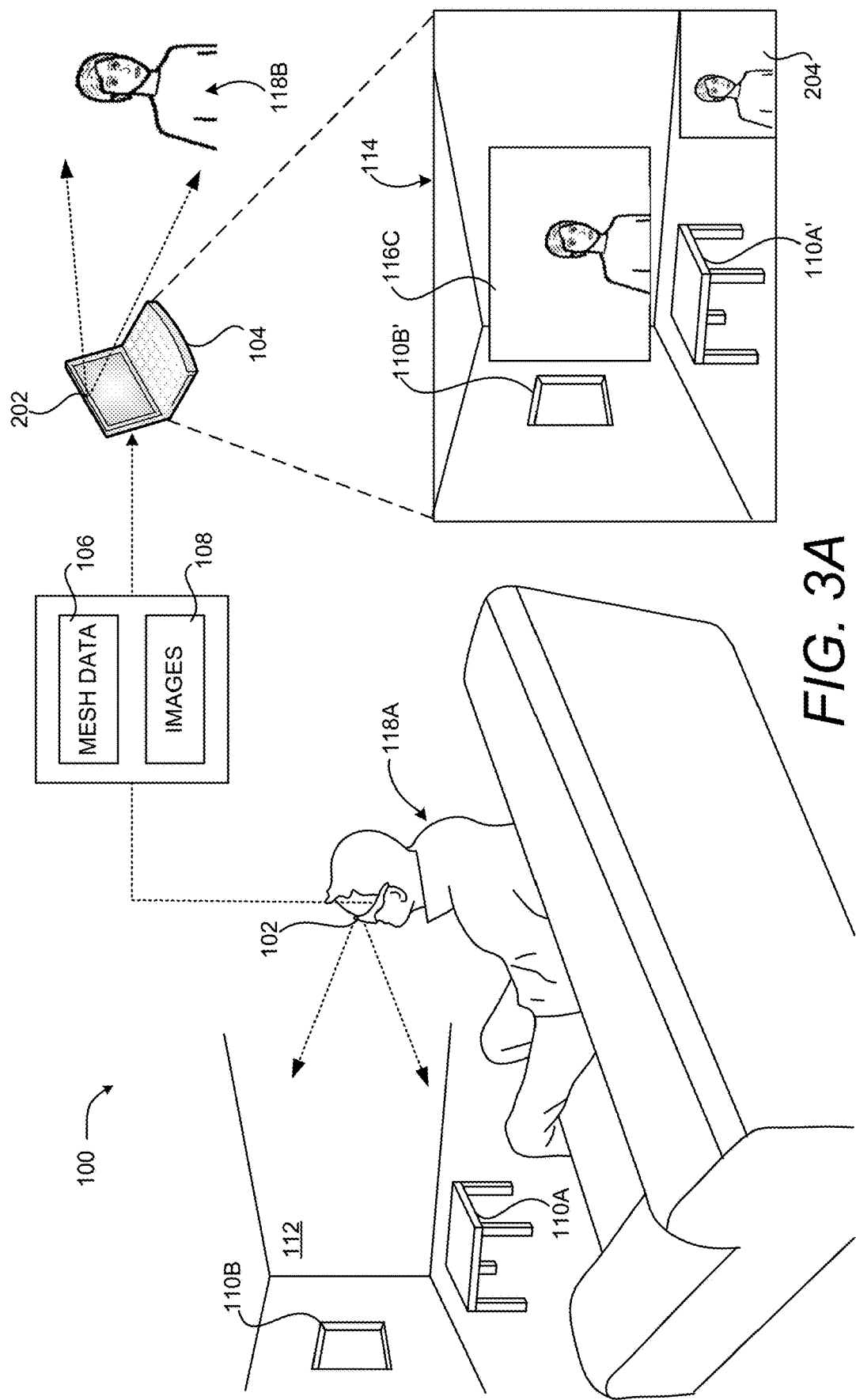
FIG. 3A is a computing system diagram illustrating aspects of another embodiment of the illustrative HCI shown in FIG. 1.
Figure 3B:
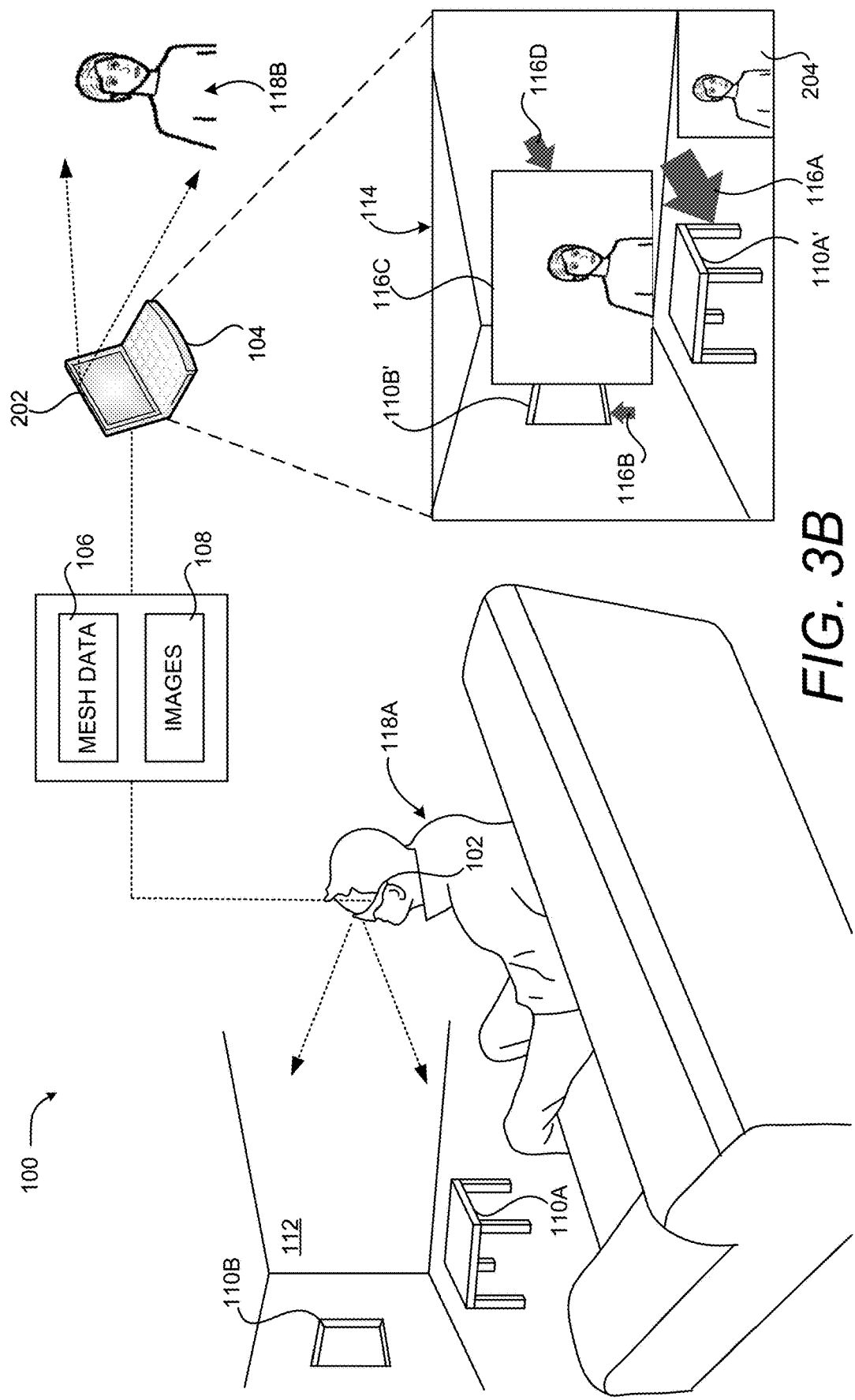
FIG. 3B is a computing system diagram showing additional aspects of the embodiment of the illustrative HCI shown in FIG. 3A.

FIGS. 3A and 3B are computing system diagrams illustrating aspects of another embodiment of the illustrative HCI described above with reference to FIG. 1. In the embodiment shown in FIGS. 3A and 3B, another virtual object 116C exists in the 3D representation of the real-world environment 112. In this example, the virtual object 116C is an image 108 of the user 118B of the remote computing device 104. The virtual object 116C is located in the 3D representation of the real-world environment 112 such that it appears at a comfortable viewing distance (e.g. six feet) from the user 118A when viewed using the computing device 102.

As shown in FIG. 3B, the user 118B can also place virtual objects 116 in association with other virtual objects 116, such as the virtual object 116C. In this example, the user 118B has placed a virtual object 116D at a location adjacent to the virtual object 116C. As a result, the computing device 104 has computed the depth for the virtual object 116D based upon the depth of the virtual object 116C in the 3D representation of the real-world environment 112 defined by the mesh data 106. Using this mechanism, the user 118B can bring attention to a real-world object 110 or a virtual object 116. Other types and shapes of 2D and 3D virtual objects 116 can be placed in a similar manner.

Figure 4A:
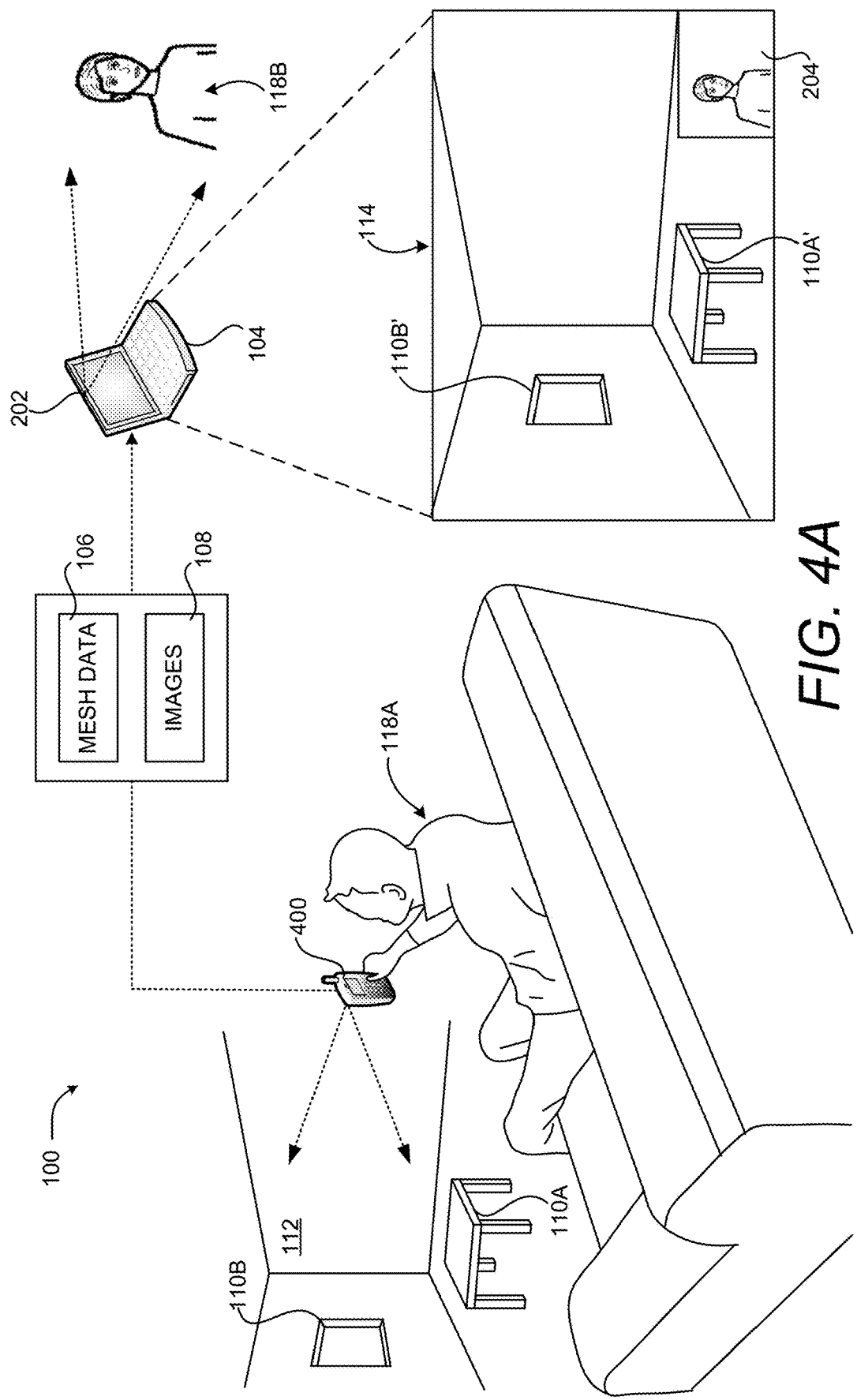
FIG. 4A is a computing system diagram showing aspects of another embodiment of the illustrative HCI shown in FIG. 1.
Figure 4B:
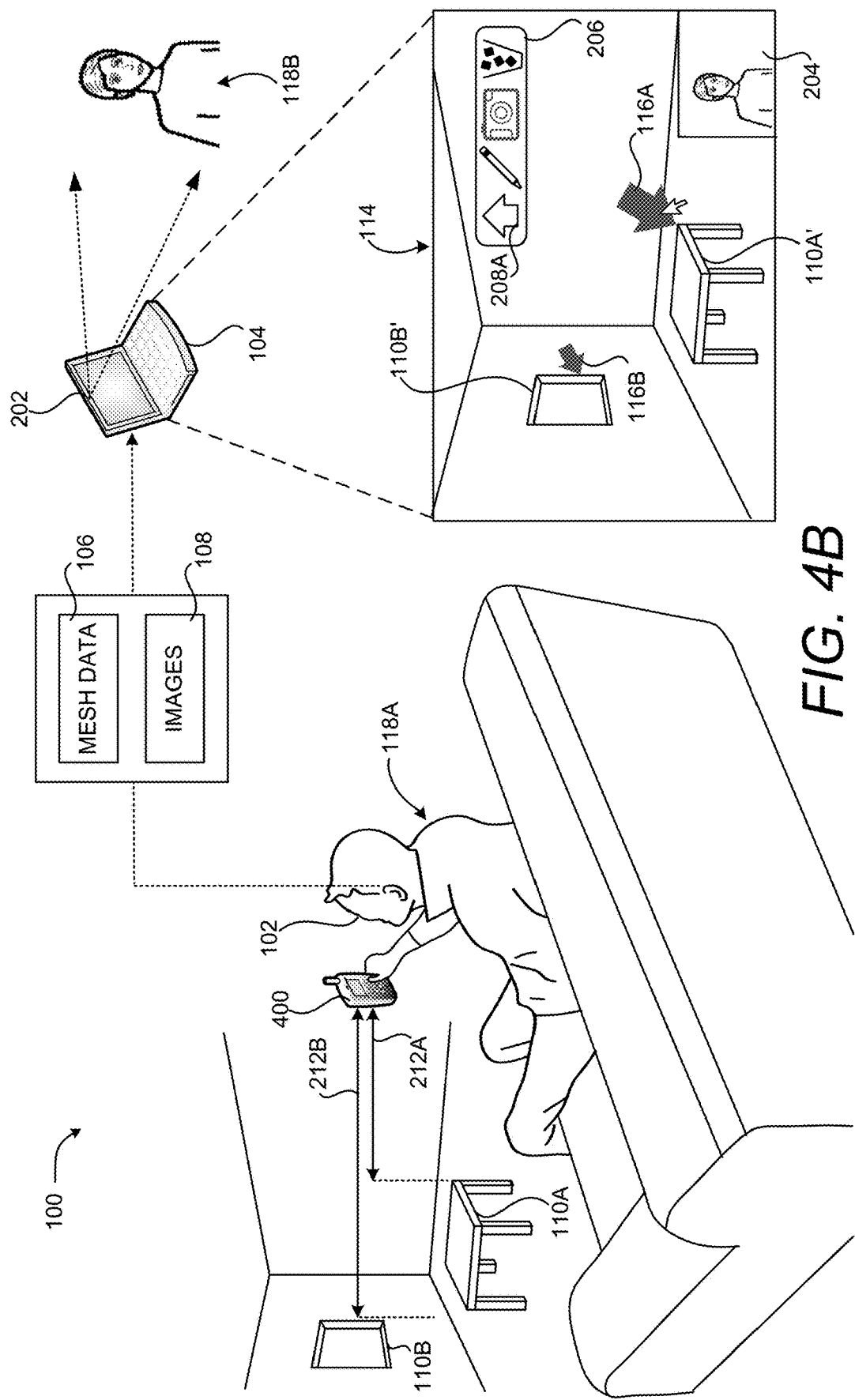
FIG. 4B is a computing system diagram illustrating additional aspects of the embodiment of the illustrative HCI shown in FIG. 4A.

FIGS. 4A and 4B are computing system diagrams illustrating aspects of another embodiment of the illustrative HCI described above with reference to FIG. 1. As illustrated in FIG. 4A, other types of computing devices can be utilized to generate the mesh data 106 and the images 108 in some embodiments. In the illustrated embodiment, for example, a suitably equipped smartphone 400 can be utilized to generate the mesh data 106 and the images 108. In order to accomplish this, the smartphone 400 can be equipped with two cameras. The cameras generate images 108 of the same real-world environment. The smartphone 400 can then compute the depth map for the real-world environment using the stereo images.

As shown in FIG. 4B, the smartphone 400 can compute the distance 212A from the smartphone 400 to the real-world object 110A (i.e. the table) using the mesh data 106. Similarly, the smartphone 400 can determine the depth of the virtual object 116B based upon the depth of the real-world object 110B (i.e. the window). The smartphone 400 can then provide the mesh data 106 to the remote computing device 104 for use in the manner described above. The smartphone 400 can receive the updated mesh data 106 and augment its display of video captured by its camera with the virtual objects 116.

As discussed above, the mesh data 106, including the location of any virtual objects 116 contained therein, can be stored at a server computer. In this embodiment, a computing device such as a smartphone 400 can retrieve the mesh data 106 and utilize the mesh data 106 to augment its display of the real-world environment 112 even if the device is incapable of generating the mesh data 106.

Figure 5A:
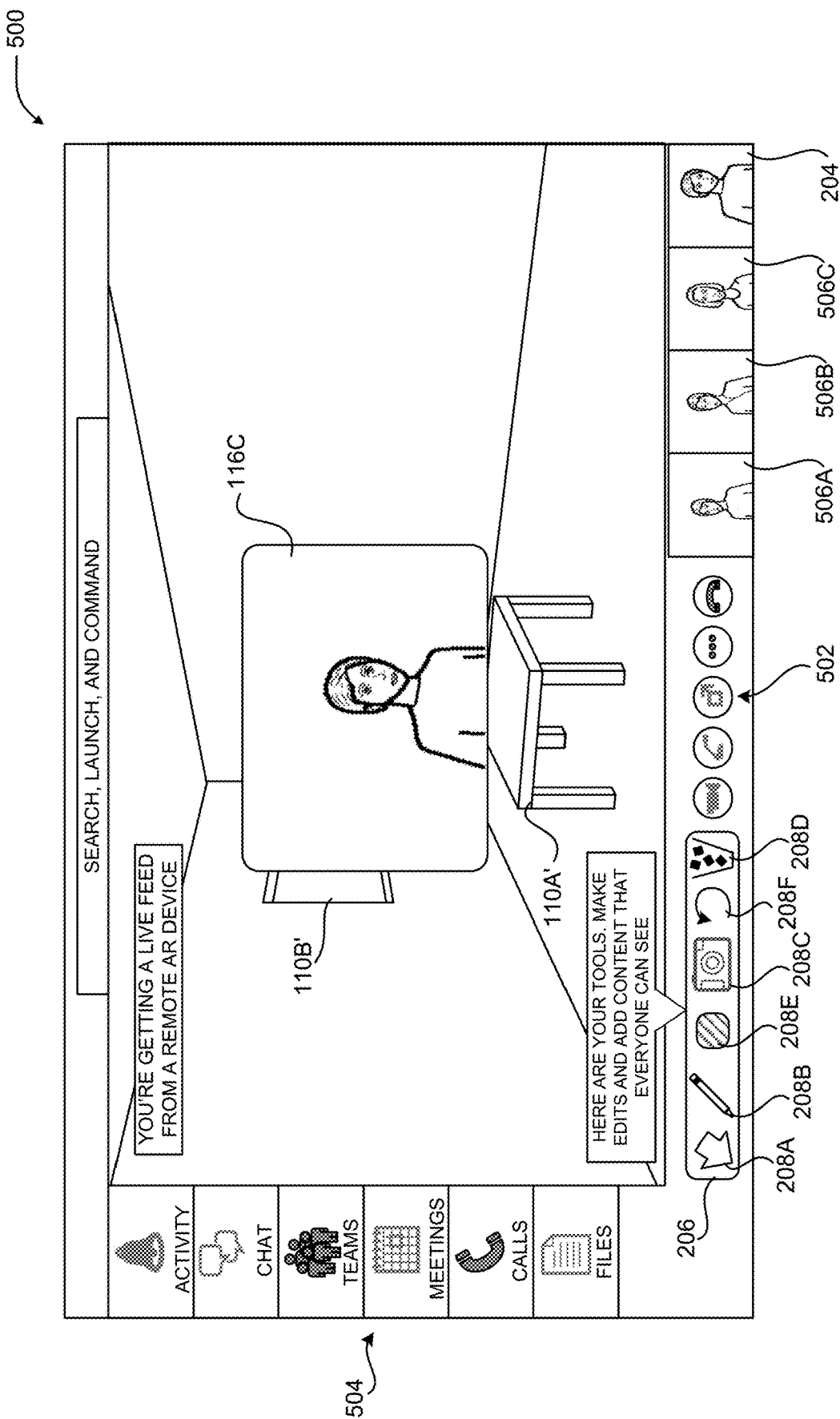
FIG. 5A is a UI diagram showing aspects of an illustrative UI that enables computationally efficient placement and sizing of virtual objects in a 3D representation of a real-world environment, according to one embodiment disclosed herein.
Figure 5B:
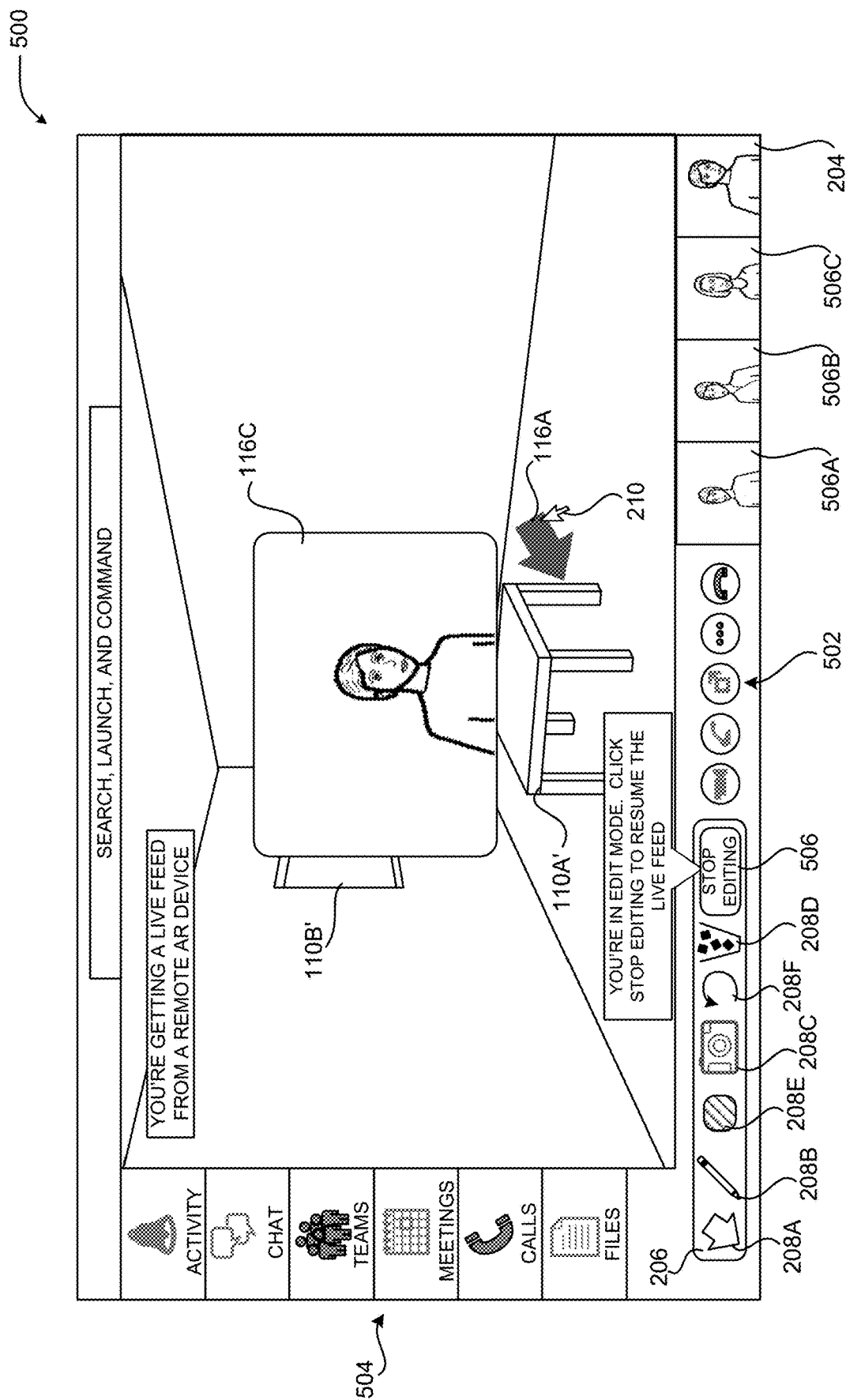
FIG. 5B is a UI diagram showing additional aspects of the illustrative UI shown in FIG. 5A, according to one embodiment disclosed herein.
Figure 5C:
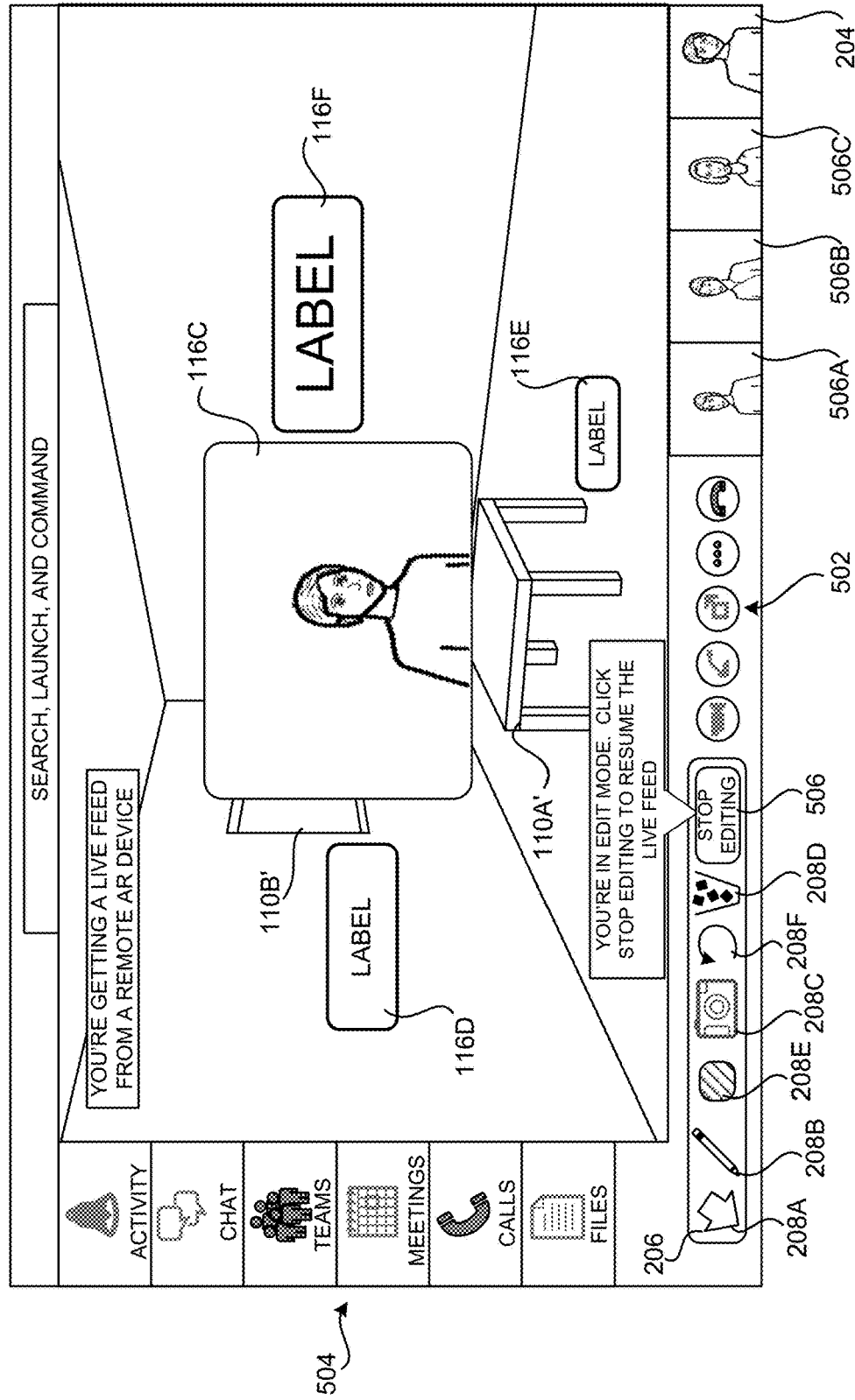
FIG. 5C is a UI diagram showing additional aspects of the illustrative UI shown in FIGS. 5A and 5B, according to one embodiment disclosed herein.

FIGS. 5A-5C are UI diagrams showing aspects of an illustrative UI 500 that enables computationally efficient placement and sizing of virtual objects 116 in a 3D representation of a real-world environment 112, according to one embodiment disclosed herein. As discussed briefly above, the technologies disclosed herein can be utilized in conjunction with an application program that provides functionality for holding networked meetings. A UI 500 presented by such an application is shown in FIGS. 5A-5C and described below.

As with the UI 114, the UI 500 includes a rendering of the images 108 of the real-world environment 112 generated by the computing device 102. In this manner, a user 118B of the remote computing device 104 can see the view of the real-world environment 112 as seen by the user 118A of the computing device 102 along with any virtual objects 116 augmenting that view. As in the examples shown in FIGS. 3A and 3B, a virtual object 116C can also be presented that shows the live video of the user 118B. The UI 500 can also include thumbnails 506A-506C, static or moving, of the other participants in a networked meeting.

As illustrated in FIG. 5A, the UI 500 can also include UI controls 502 for controlling aspects of the networked meeting such as, but not limited to, initiating or ending a networked meeting, sharing content with other participants in the networked meeting, muting and unmuting an audio capture device, and starting or stopping the sharing of live video. Other UI controls 502 can be provided in other embodiments.

As also illustrated in FIG. 5A, the UI 500 can also include UI controls 504 for performing other tasks relating to a networked meeting. For example, and without limitation, the UI controls 504 can provide functionality for showing notifications, showing a list of users and associated chat sessions, showing available groups or teams of users, showing the meetings during a day or other time period, and showing any recently shared or used files. Other UI controls 504 for performing other types of functionality can be provided in other embodiments.

The UI 500 can also include the UI 206 shown in FIGS. 2A-2C and 4B and described above for enabling the placement, modification, and deletion of content on the images 108. As discussed above, the UI control 208A enables a user 118B to place a virtual object 116, the UI control 208B enables a user 118B to draw on the rendering of the images 108, the UI control 208C enables a user to place a digital picture over the rendering of the images 108, and the UI control 208D enables a user to delete a previously-placed virtual object 116, a drawing, or picture. The embodiment shown in FIGS. 5A-5C also includes UI control 208F for undoing a previous operation and a UI control 208E that provides functionality for selecting the color of a virtual object 116. Other UI controls 208 can be provided in other embodiments.

As in the examples described above, a user 118B can interact with the UI 500 utilizing mouse input, touch input, or other types of input. In the example shown in FIG. 5B, for instance, the user 118B has moved a mouse cursor 210 over the UI control 208A in order to initiate the placement of a virtual object 116A, clicked, and dragged the mouse cursor 210 toward the rendering of the real-world object 110A'. When the user 118B releases the mouse button, the virtual object 116A is placed at the specified location in the manner described above.

In one embodiment, the rendering of the real-world environment 112 shown in the UI 114 is paused while the user 118B is placing a virtual object 116. By pausing the rendering of the real-world environment 112, the user 118B can more easily place a virtual object 116 on the images 108. Once the virtual object 116 has been placed, the rendering of the real-world environment 112 can resume. In other embodiments, the rendering of the real-world environment 112 shown in the UI 114 is not paused while the user 118B is placing a virtual object 116.

As discussed briefly above, when a user 118B places a virtual object 116 on the rendering of the images 108, the application program executing on the computing device 104 utilizes the mesh data 106 to determine the depth of the location specified by the user 118B within the 3D representation of the real-world environment 112. In one embodiment, the depth of a new virtual object 116 is the same as the depth of a real-world object 110 or a virtual object 116 that exists at the specified location for the new virtual object 116.

As in the example described above, the rendering of the real-world environment 112 shown in the UI 500 can be paused while the user 118B is placing a virtual object 116. By pausing the rendering of the real-world environment 112, the user 118B can more easily place a virtual object 116 on the images 108. Once the virtual object 116 has been placed, the rendering of the real-world environment 112 can resume. Alternately, a UI control 506 shown in FIG. 5B can be provided which, when selected, will resume the rendering of the images 108 of the real-world environment 112.

As mentioned above, other types and shapes of 2D or 3D virtual objects 116 can be placed and sized in the manner described herein. In the example shown in FIG. 5B, for instance, virtual objects 116D-116F have been placed and sized in the 3D rendering of the real-world environment 112 in the manner described above. The virtual objects 116D-116F are labels that have text that can be customized to provide information to a viewer. Other types of virtual objects 116 can be placed and sized in a similar manner.

As summarized above, the techniques disclosed herein can enable a user to control a location, size, and orientation of virtual objects in a 3D representation of a real-world environment based on simplified user gestures. In some embodiments, based on the timing and direction of an input gesture, a computing device can utilize an automated mode that determines a position and orientation of a virtual object or utilize a manual mode that determines position, orientation, and size of the virtual object. The modes can be selected based on a type of user gesture. For example, a first type of user gesture may include a short tap of a button, e.g., if a mouse button is held for less than a threshold period of time. As will be described in more detail below, the manual mode may be invoked when a second type of user gesture is received. A second type of user gesture may include a press-and-hold action, e.g., if a mouse button is held for more than the threshold period of time. To illustrate these aspects, FIGS. 6A-6F illustrate an example of a user input gesture that invokes the automated mode. FIGS. 7A-7F and FIGS. 8A-8F illustrate examples of user input gesture that invokes the manual mode.

With reference to FIGS. 6A-6F, an example involving the manual mode is shown and described. In this example, the automated mode is invoked in response to a first type of input action, such as a short tap of a mouse button. In response to detecting the first type of input action, a virtual object, such as an arrow, can be placed at the position of the input action. The orientation of the virtual object is determined by the direction of the movement of an input device immediately prior to the input action. The size of the virtual object can be based on one or more factors. For instance, the size of the virtual object can correspond to a distance between a real-world object and one or more sensors.

As shown in FIG. 6A, to invoke the automatic mode, a user 118B first selects UI control 208A using a mouse, touch input, or another type of user input device. In the example shown in FIG. 6A, the user 118B has selected the UI control 208A using an input device and an associated mouse cursor 210. Once the user 118B has selected the UI control 208A, as shown in FIG. 6B, the user can move the cursor 260 to any desired location. In this example, the movement is illustrated by a dotted line.

As shown in FIG. 6C, a position (indicted by the dashed crosshairs 689) is selected in response to receiving an input action, such as an actuation of a mouse button, etc. The position that is selected for the virtual object is based on the location of the cursor 260. As summarized above, the timing of the input action controls whether the computing device utilizes automated mode or manual mode. In one illustrative example, the automated mode is invoked in response to a first type of input action, such as a short tap of a mouse button. A short tap can comprise both a button down and a button up action within a predetermined period of time.

The orientation of the virtual object that is to be placed is determined by the direction of the movement of the cursor 260 immediately prior to the input action. To achieve this feature, as shown in FIG. 6D, the computing device monitors the direction and path of the cursor 260 prior to the input action. In some implementations, as shown in FIG. 6E, the computing device may generate data defining a vector 690 and the vector 690 can be used to determine the orientation of the virtual object. Based on the position and the determined orientation, as shown in FIG. 6F, the virtual object 116 can be rendered on the user interface.

In some configurations, when using the automated mode, the size of the virtual object 116 can correspond to a distance between a real-world object and one or more sensors. When the virtual object 116 is placed in association with a real-world object, the length and/or width of the object can be based on the distance between the real-world object and one or more sensors. For instance, as described above, when an arrow is placed in association with the table, the arrow may be one size. When the arrow is placed in association with the window, which may be further from the computing device than the table, the arrow may be another size, small or larger. In some configurations, the size of the virtual object 116 can be based on a velocity of movement prior to the input action. Thus, in the example described above, an arrow may be larger or smaller based on the velocity of the cursor 260 prior to the input action.

Although the example described above involves an input device having a button, such as a mouse, it can be appreciated that the techniques disclosed herein can utilize any other suitable input device. For example, the techniques disclosed herein can utilize a computing device having a touchscreen. In such an implementation, once the user 118B first selects UI control 208A for placement of the virtual object, the user can trace a finger or pen on a touchscreen allowing the computing device to monitor the direction of movement. When the user performs an input action, e.g., the user lifts his or her finger or pen from the touch surface or provides a voice command, the computing device can determine a position based on the location of the contact point between the touchscreen and the finger or pen. The position of the virtual object can be at the point at which the user lifted his or her finger or pen, and the orientation of the object can be based on the direction movement prior to the input action.

The system can also utilize eye tracking features. For instance, the input action can involve eye movements that are captured by a sensor in communication with the system. The sensor can generate input data indicating the position of the object to be placed. The sensor can also generate input data indicating the input action by a gesture performed by the user. For instance, the user can blink to place virtual objects or provide a voice command to place virtual objects.

With reference to FIGS. 7A-7F, an example involving the manual mode is shown and described. The manual mode is invoked in response to a second type of input action, such as a press and hold action of an input device. In response to detecting the second type of input action, a first point of the virtual object, such as a tip of an arrow, is placed at the position of a cursor at the time of the input action. During the press and hold action, the first point of the virtual object is locked at the position and the size and orientation of the virtual object are manipulated by the movement of the cursor. In response to detecting a subsequent input action, such as a release action, a second point of the virtual object, such as the tail of the arrow, is placed at the position of the cursor at the time of the subsequent input action.

To invoke the manual mode, a user 118B can select the UI control 208A using a mouse, touch input, or another type of user input device. In the example shown in FIG. 7A, the user 118B has selected the UI control 208A using an input device and an associated mouse cursor 210. Once the user 118B has selected the UI control 208A, the user can move the cursor 260 to any desired location.

Figure 7A:
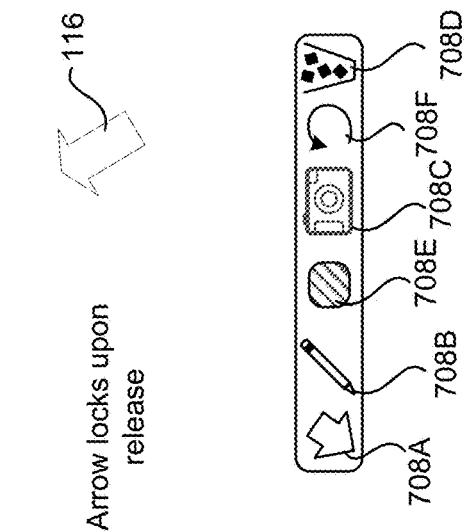
FIG. 7A is a UI diagram showing a location that is determined for placement of a virtual object based on an input action.

As shown in FIG. 7A, a first position for a first point of the virtual object is selected in response to receiving an input action, such as an actuation of a mouse button, etc. The first position (indicted by the dashed crosshairs) that is selected for the first point of the virtual object is based on the location of the cursor 260 at the time of the input action. In this example, the first point of the virtual object is the tip of an arrow. As summarized herein, the manual mode is invoked in response to a second type of input action, such as a press and hold action, where an input device is held for a threshold period of time.

Figure 7B:
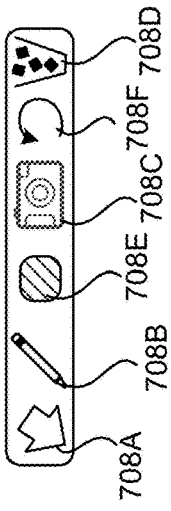
FIG. 7B is a UI that illustrates how the virtual object shown in FIG. 7A can be generated based on the input gesture.
Figure 7C:
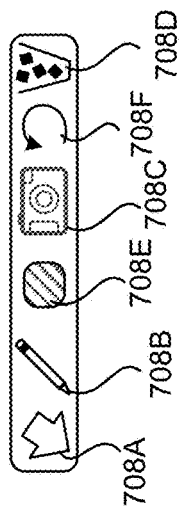
FIG. 7C is a UI that illustrates how the virtual object shown in FIG. 7A can be resized and rotated in a clockwise direction based on the input gesture.
Figure 7D:
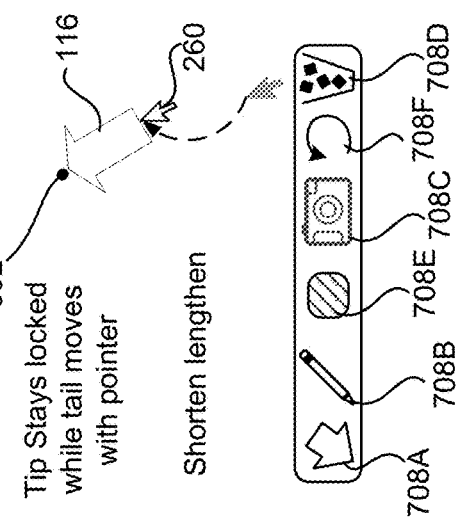
FIG. 7D is a UI that illustrates how the virtual object shown in FIG. 7A can be resized and rotated in a counter-clockwise direction based on the input gesture.
Figure 7E:
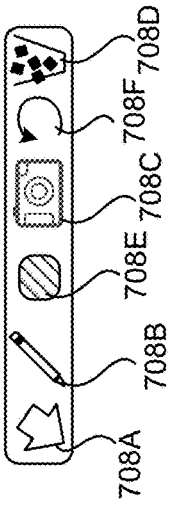
FIG. 7E is a UI that illustrates how the virtual object shown in FIG. 7A can be resized to a smaller size based on the input gesture.
Figure 7F:
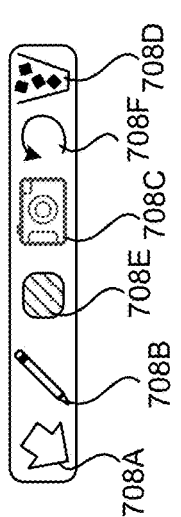
FIG. 7F is a UI diagram showing a full rendering of the virtual object that is positioned and oriented based on the input gesture.

In response to determining that an input device has been held for at least a threshold time, as shown in FIG. 7B, the virtual object 116 is rendered and a second point of the virtual object, such as the tail of a narrow, is configured to move with the cursor 260. Thus, as shown in FIG. 7B and FIG. 7C, given that the first point of the virtual object is locked at the first position, the length of the virtual object 116 can change based on the distance between the position of the cursor 260 and the first position. As shown in FIG. 7D, the orientation of the virtual object 116 can also be changed based on the movement of the cursor 260. Given that the second point of the virtual object moves with the cursor 260, orientation and size of the virtual object can be changed simultaneously. As shown in FIG. 7E, the virtual object can be shortened by moving the cursor 260 toward the first point. As shown in FIG. 7F, in response to receiving a subsequent input action, such as a release of the input device, the second point of the virtual object, such as the tail of the arrow, is placed at the position of the cursor at the time of the subsequent input action. As shown, the size (at least one dimension) of the virtual object can be based on a distance between the first point and the second point.

The example provided above is for illustrative purposes and is not to be construed as limiting. It can be appreciated that any virtual object of any shape, size, or orientation, can be configured according to the techniques disclosed herein. In one illustrative example, shown in FIGS. 8A-8F, the virtual object can be in the form of an arrow, where the first point of the virtual object is the tail of the arrow and the second point of the virtual object is the tip of the arrow.

As shown in FIG. 8A, a first position for a first point of the virtual object is selected in response to receiving an input action, such as an actuation of a mouse button, etc. The first position (indicted by the dashed crosshairs) that is selected for the first point of the virtual object is based on the location of the cursor 260 at the time of the input action. In this example, the first point of the virtual object is the tail of an arrow. As summarized herein, the manual mode is invoked in response to a second type of input action, such as a press and hold action, where an input device is held for a threshold period of time. While the input device is held, the first point of the virtual object remains locked at the first position.

In response to determining that an input device has been held for at least a threshold time, as shown in FIG. 8B, the virtual object 116 is rendered and a second point of the virtual object, such as the tip of a narrow, is configured to move with the cursor 260. Thus, as shown in FIG. 8B and FIG. 8C, given that the first point of the virtual object is locked at the first position, the length of the virtual object 116 can change based on the distance between the position of the cursor 260 and the first position.

As shown in FIG. 8D, the orientation and size of the virtual object 116 can also be changed based on the movement of the cursor 260. Given that the second point of the virtual object moves with the cursor 260, orientation and size of the virtual object 116 can be changed simultaneously with one gesture. As shown in FIG. 8E, the virtual object 116 can be shortened by moving the cursor 260 toward the first point. As shown in FIG. 8F, in response to receiving a subsequent input action, such as a release of the input device, the second point of the virtual object, such as the tip of the arrow, is placed at the second position of the cursor at the time of the subsequent input action. As shown, the size (at least one dimension) of the virtual object can be based on a distance between the first point and the second point.

FIG. 9A through FIG. 9D illustrates an example scenario involving the automated mode. As shown, a user can easily position and orient a number of virtual objects by the use of a single motion gesture combined with several input actions.

FIG. 9A is a UI diagram showing the start of an input gesture for placing a plurality of virtual objects. As shown, input data indicating movement is represented in the drawings by the dashed line. A first virtual object 116A at a first position 901A is rendered in response to a first input action. The input action can be a voice command or an input such as a mouse click. Thus, when a touch surface is used, a user can drag their finger across the surface and give voice commands to place the virtual objects. As shown, the orientation of the first virtual object 116A is based on a direction of the movement that was made prior to the first position 901A.

As shown in FIG. 9B, as the user's motion gesture continues, the user can provide a second input action, such as a voice command or the actuation of a mouse button, to cause the selection of the second position 901B. In response, the second virtual object 116B is rendered. As shown in FIG. 9C, the user can provide a third virtual object 901C at a third position 901C and a fourth virtual object 901D at a fourth position 901D by repeating the above described steps.

In some configurations, annotations 117 can be added to each virtual object automatically when a series of virtual objects is provided. FIG. 9D is a UI diagram showing the plurality of virtual objects 116 placed by the user gesture described above and shown in FIG. 9A through FIG. 9C. In this example, content, such as numbers, is displayed in proximity to each virtual object 116. Such an example may result when voice commands are used to position each virtual object 116. For instance, as the user is moving a cursor across a screen, the user may provide the voice commands "one," "two," "three," "four," etc. As each input action is received, content of the voice command can be displayed for each corresponding virtual object 116. In this example a first annotation 117A, second annotation 117B, third annotation 117C, and fourth annotation 117D are place in response to the input action. Any annotation with any content can be displayed.

Figure 10:
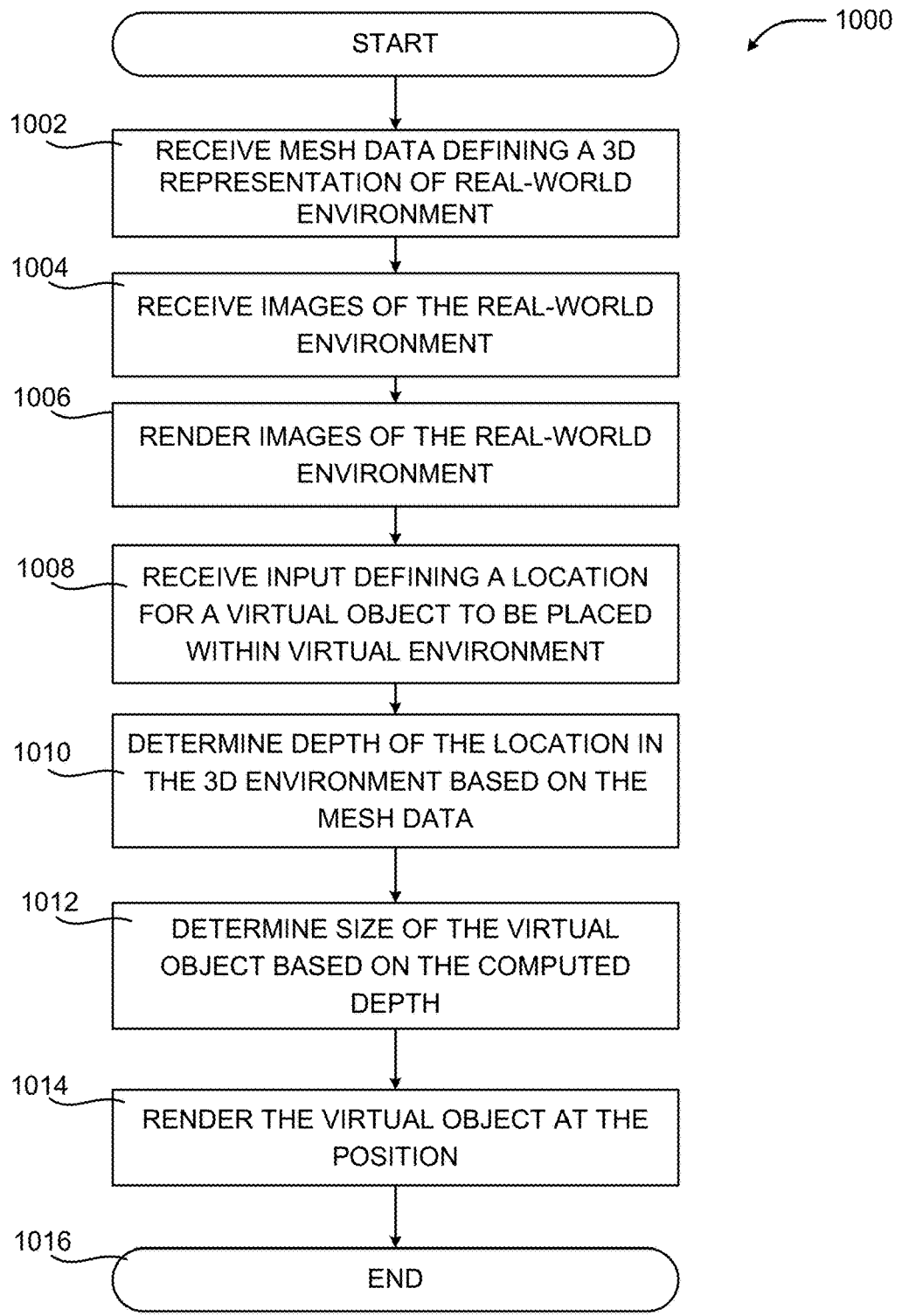
FIG. 10 is a computing system diagram illustrating aspects of a routine for computationally efficient placement and sizing of virtual objects in a 3D representation of a real-world environment, according to one embodiment disclosed herein.

FIG. 10 is a diagram illustrating aspects of a routine 1000 for computationally efficient placement and sizing of virtual objects 116 in a 3D representation of a real-world environment 112, according to one embodiment disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 10 and the other FIGS. can be implemented in association with the example presentation GUIs described above with respect to FIGS. 1 through 9D. For instance, the various device(s) and/or module(s) described herein can generate, transmit, receive, and/or display data associated with content of a communication session (e.g., live content, recorded content, etc.) and/or a presentation GUI that includes images 108 of one or more participants (e.g. the user 118A or a user 118B of the remote computing device 104), avatars, channels, chat sessions, video streams, images, virtual objects 116, and/or applications associated with a communication session.

The routine 1000 begins at operation 1002, where the computing device 104 receives mesh data 106 that defines a 3D representation of a real-world environment 112 from the computing device 102. The routine then proceeds to operation 1002, where the computing device 104 receives images 108 of the real-world environment 112 from the computing device 102. The routine 1000 then proceeds from operation 1004 to operation 1006.

At operation 1006, the computing device 104 renders the images 108 of the real-world environment 112 provided by the computing device 102. The routine 1000 then proceeds to operation 1008, where the computing device 104 receives user input defining a location (also referred to herein as a "position") for a virtual object 116 to be placed within the 3D environment defined by the mesh data 106. As discussed above, various UIs can be utilized to enable a user to specify the location of a virtual object 116.

As summarized above, the user input, can cause the computing device 104 to invoke (1) an automated mode that determines a position and orientation of an object or (2) a manual mode that determines position, orientation and size of an object. In one illustrative example, one or more computing devices disclosed herein can receive input data indicating an input action and a position for a virtual object 116 to be placed within the three-dimensional representation of the real-world environment 112. An input action can include a voice command, a click of a mouse button, a user contact with a touch service, etc.

One or more computing devices can determine if the input action meets one or more criteria. In one illustrative example, one in which involves an input device having a button, the input action can indicate a duration that is based on a first time that a button of an input device is activated to second time that the button is deactivated. The input action can be determined to meet one or more criteria when the duration is less than a threshold amount of time. For example, if the user depresses and releases a mouse button within a half a second, a second, or any other predetermined period of time, the input action can be determined to meet the one or more criteria. In such an embodiment, this input action can invoke the automated mode described herein. If, however, the duration is greater than the threshold amount of time, the input action can invoke the manual mode described herein.

In another illustrative example, one in which involves a touch surface, the input action can be determined to meet one or more criteria when contact between a user and a touch surface of the system includes movement that passes over a boundary that is a threshold distance from an initial contact point within a predetermined time. The initial contact point is the point at which the user first made contact with a touch surface. In such an embodiment, this input action can be determined to meet one or more criteria when the user touches an input surface and moves his or her finger outside of a circular boundary having a predetermined radius. As described below, this type of input invokes the automated mode. Thus, in response to determining that the input action meets one or more criteria, one or more computers can render the virtual object 116 in the UI 114 at the position within the three-dimensional representation of the real-world environment 112, wherein an orientation of the virtual object 116 is based on the direction of movement indicated by an input device captured prior to the input action.

If, however, the user touches the input surface and moves his or her finger in a pattern that remains in the circular boundary, this type of input gesture invokes the manual mode. For instance, if the user touches an input surface and moves in a circular pattern within a boundary having a predetermined radius, such a gesture can invoke the manual mode and the user can configure a virtual object 116 in a manner that is described above with respect to FIG. 7A through FIG. 8F. Thus, in response to determining that the input action does not meet one or more criteria, one or more computers can render the virtual object 116 in the UI 114, wherein a first point (such as the tip of an arrow) of the virtual object 116 is at the position where the user first made contact with the surface, and a second point (such as a tail of an arrow) of the virtual object 116 is located at a second position that is determined in response to a subsequent input action (e.g., when the use lifts his or her finger). In this example, the first point may be placed in response to a down action on mouse button or a user touching a surface (a position where the input action occurred), and the second point may be placed in response to an up action on a mouse button or when a user lifts a finger from a surface (a position where the subsequent input action occurred). Once in manual mode, the movement of the virtual object may track any type of movement provided by the input data. For instance, the tail or the tip of an arrow a track a user's movement and modify an orientation of the virtual object. The tail or the tip of an arrow a track a user's movement and modify a size of the virtual object based on a distance between the first point and the second point.

When operating in automated mode, the size of a virtual object may be controlled by the mesh data. In one illustrative example, a size parameter of the virtual object 116 can be based upon a distance of a real-world object from a computing device or a sensor of the computing device, such as an HMD shown in FIG. 1. In some configurations, the size parameter may include the length of the virtual object, the width of a virtual object, the circumference or diameter of a virtual object, or any other size parameter.

Thus, in operation 1010, the computing device 104 can determine the depth of the location specified at operation 1008 in the 3D environment using the mesh data 106. Once the depth of the virtual object 116 has been determined, the routine 1000 proceeds to operation 1012, where the computing device 104 determines the size of the virtual object 116 based upon the depth calculated at operation 1010.

Once the size of the virtual object 116 has been determined, the routine 1000 proceeds to operation 1014, where the computing device 104 renders the virtual object at the size and location computed at operations 1012 and 1010, respectively. The routine 1000 then proceeds to operation 1014. From operation 1014 the routine 1000 proceeds to operation 1016, where it ends.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
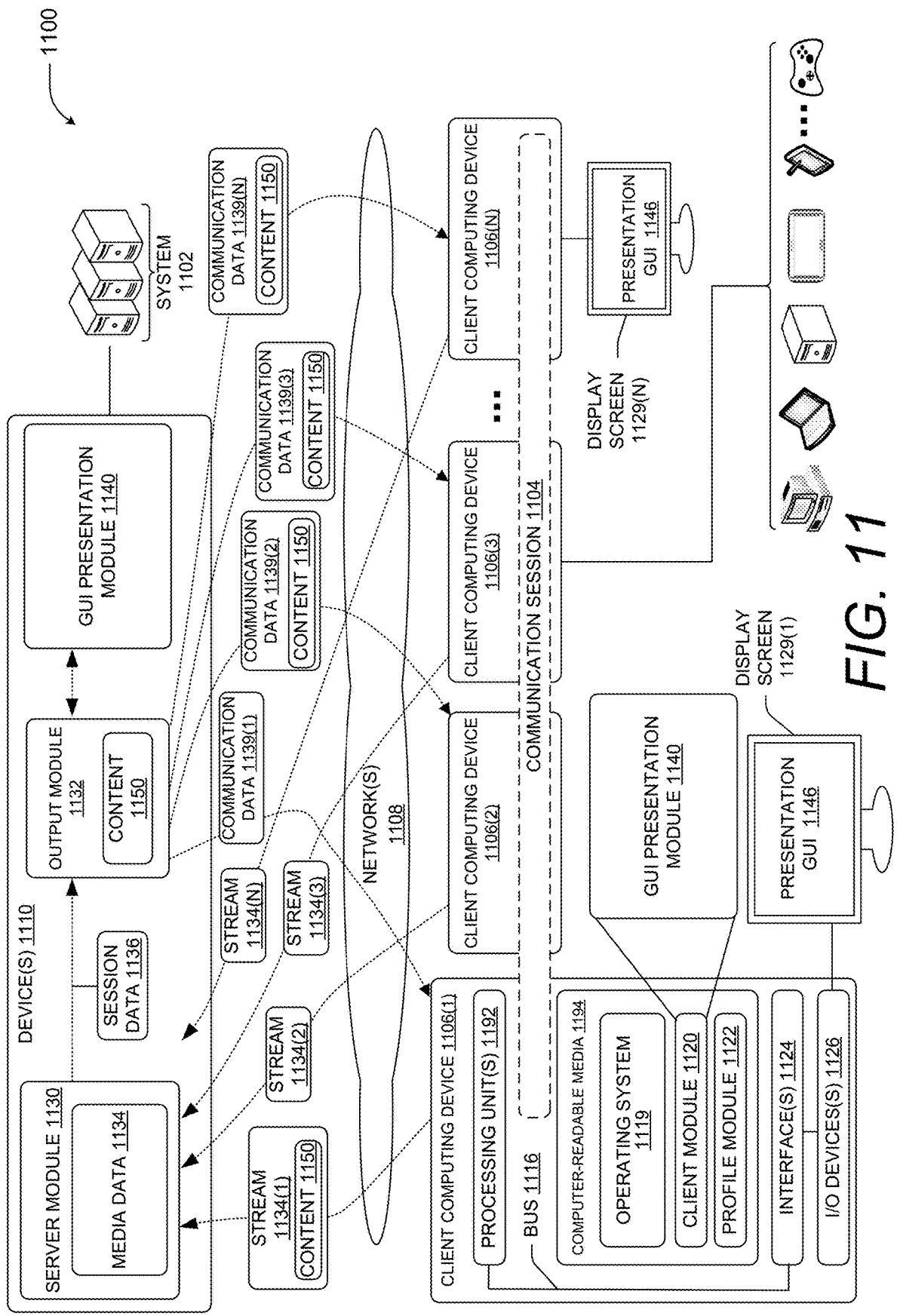
FIG. 11 is a computing system diagram showing aspects of an illustrative operating environment for the technologies disclosed herein.

FIG. 11 is a diagram illustrating an example environment 1100 in which a system 1102 can operate to populate the HCI disclosed herein with images 108, virtual objects 116, and/or other types of presentation content. In some implementations, a system implemented agent may function to collect and/or analyze data associated with the example environment 1100. For example, the agent may function to collect and/or analyze data exchanged between participants involved in a communication session 1104 linked to the GUIs disclosed herein.

As illustrated, the communication session 1104 may be implemented between a number of client computing devices 1106(1) through 1106(N) (where N is a positive integer number having a value of two or greater) that are associated with the system 1102 or are part of the system 1102. The client computing devices 1106(1) through 1106(N) enable users, also referred to as individuals, to participate in the communication session 1104. For instance, the first client computing device 1106(1) may be the computing device 104 of FIG. 1 and the second client computing device 1106(2) may be the computing device 102 of FIG. 1, and computing device 1300 of FIG. 13.

In this example, the communication session 1104 is hosted, over one or more network(s) 1108, by the system 1102. That is, the system 1102 can provide a service that enables users of the client computing devices 1106(1) through 1106(N) to participate in the communication session 1104 (e.g., via a live viewing and/or a recorded viewing). Consequently, a "participant" to the communication session 1104 can comprise a user and/or a client computing device (e.g., multiple users may be in a communication room participating in a communication session via the use of a single client computing device), each of which can communicate with other participants. As an alternative, the communication session 1104 can be hosted by one of the client computing devices 1106(1) through 1106(N) utilizing peer-to-peer technologies. The system 1102 can also host chat conversations and other team collaboration functionality (e.g., as part of an application suite).

In some implementations, such chat conversations and other team collaboration functionality are considered external communication sessions distinct from the communication session 1104. A computerized agent to collect participant data in the communication session 1104 may be able to link to such external communication sessions. Therefore, the computerized agent may receive information, such as date, time, session particulars, and the like, that enables connectivity to such external communication sessions. In one example, a chat conversation can be conducted in accordance with the communication session 1104. Additionally, the system 1102 may host the communication session 1104, which includes at least a plurality of participants co-located at a meeting location, such as a meeting room or auditorium, or located in disparate locations.

In examples described herein, client computing devices 1106(1) through 1106(N) participating in the communication session 1104 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 1104 live as activity occurs, or alternatively, via a recording at a later time after the activity occurs. In examples described herein, client computing devices 1106(1) through 1106(N) participating in the communication session 1104 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 1102 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more communication sessions such as communication session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1112 operably connected to computer-readable media 1184 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1194 may include, for example, an operating system 1119, a client module 1120, a profile module 1122, and other modules, programs, or applications that are loadable and executable by data processing units(s) 1192.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1128(1)), which can display a GUI according to the techniques described herein.

In the example environment 1100 of FIG. 11, client computing devices 1106(1) through 1106(N) may use their respective client modules 1120 to connect with one another and/or other external device(s) in order to participate in the communication session 1104, or in order to contribute activity to a collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile module 1122 to generate participant profiles (not shown in FIG. 11) and provide the participant profiles to other client computing devices and/or to the device(s) 1110 of the system 1102. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 11, the device(s) 1110 of the system 1102 includes a server module 1130 and an output module 1132. In this example, the server module 1130 is configured to receive, from individual client computing devices such as client computing devices 1106(1) through 1106(N), media streams 1134(1) through 1134(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 1130 is configured to receive a collection of various media streams 1134(1) through 1134(N) during a live viewing of the communication session 1104 (the collection being referred to herein as "media data 1134"). In some scenarios, not all the client computing devices that participate in the communication session 1104 provide a media stream. For example, a client computing device may only be a consuming, or a "listening", device such that it only receives content associated with the communication session 1104 but does not provide any content to the communication session 1104.

In various examples, the server module 1130 can select aspects of the media streams 1134 that are to be shared with individual ones of the participating client computing devices 1106(1) through 1106(N). Consequently, the server module 1130 may be configured to generate session data 1136 based on the streams 1134 and/or pass the session data 1136 to the output module 1132. Then, the output module 1132 may communicate communication data 1138 to the client computing devices (e.g., client computing devices 1106(1) through 1106(3) participating in a live viewing of the communication session). The communication data 1138 may include video, audio, and/or other content data, provided by the output module 1132 based on content 1150 associated with the output module 1132 and based on received session data 1136.

As shown, the output module 1132 transmits communication data 1138(1) to client computing device 1106(1), and transmits communication data 1138(2) to client computing device 1106(2), and transmits communication data 1138(3) to client computing device 1106(3), etc. The communication data 1138 transmitted to the client computing devices can be the same or can be different (e.g., positioning of streams of content within a user interface may vary from one device to the next).

In various implementations, the device(s) 1110 and/or the client module 1120 can include GUI presentation module 1140. The GUI presentation module 1140 may be configured to analyze communication data 1138 that is for delivery to one or more of the client computing devices 1106. Specifically, the GUI presentation module 1140, at the device(s) 1110 and/or the client computing device 1106, may analyze communication data 1138 to determine an appropriate manner for displaying video, image, and/or content on the display screen 1128 of an associated client computing device 1106. In some implementations, the GUI presentation module 1140 may provide video, image, and/or content to a presentation GUI 1146 rendered on the display screen 1128 of the associated client computing device 1106. The presentation GUI 1146 may be caused to be rendered on the display screen 1128 by the GUI presentation module 1140. The presentation GUI 1146 may include the video, image, and/or content analyzed by the GUI presentation module 1140.

In some implementations, the presentation GUI 1146 may include a plurality of sections or grids that may render or comprise video, image, and/or content for display on the display screen 1128. For example, a first section of the presentation GUI 1146 may include a video feed of a presenter or individual, a second section of the presentation GUI 1146 may include a video feed of an individual consuming meeting information provided by the presenter or individual. The GUI presentation module 1140 may populate the first and second sections of the presentation GUI 1146 in a manner that properly imitates an environment experience that the presenter and the individual may be sharing.

In some implementations, the GUI presentation module 1140 may enlarge or provide a zoomed view of the individual represented by the video feed in order to highlight a reaction, such as a facial feature, the individual had to the presenter. In some implementations, the presentation GUI 1146 may include a video feed of a plurality of participants associated with a meeting, such as a general communication session. In other implementations, the presentation GUI 1146 may be associated with a channel, such as a chat channel, enterprise teams channel, or the like. Therefore, the presentation GUI 1146 may be associated with an external communication session that is different than the general communication session.

Figure 12:
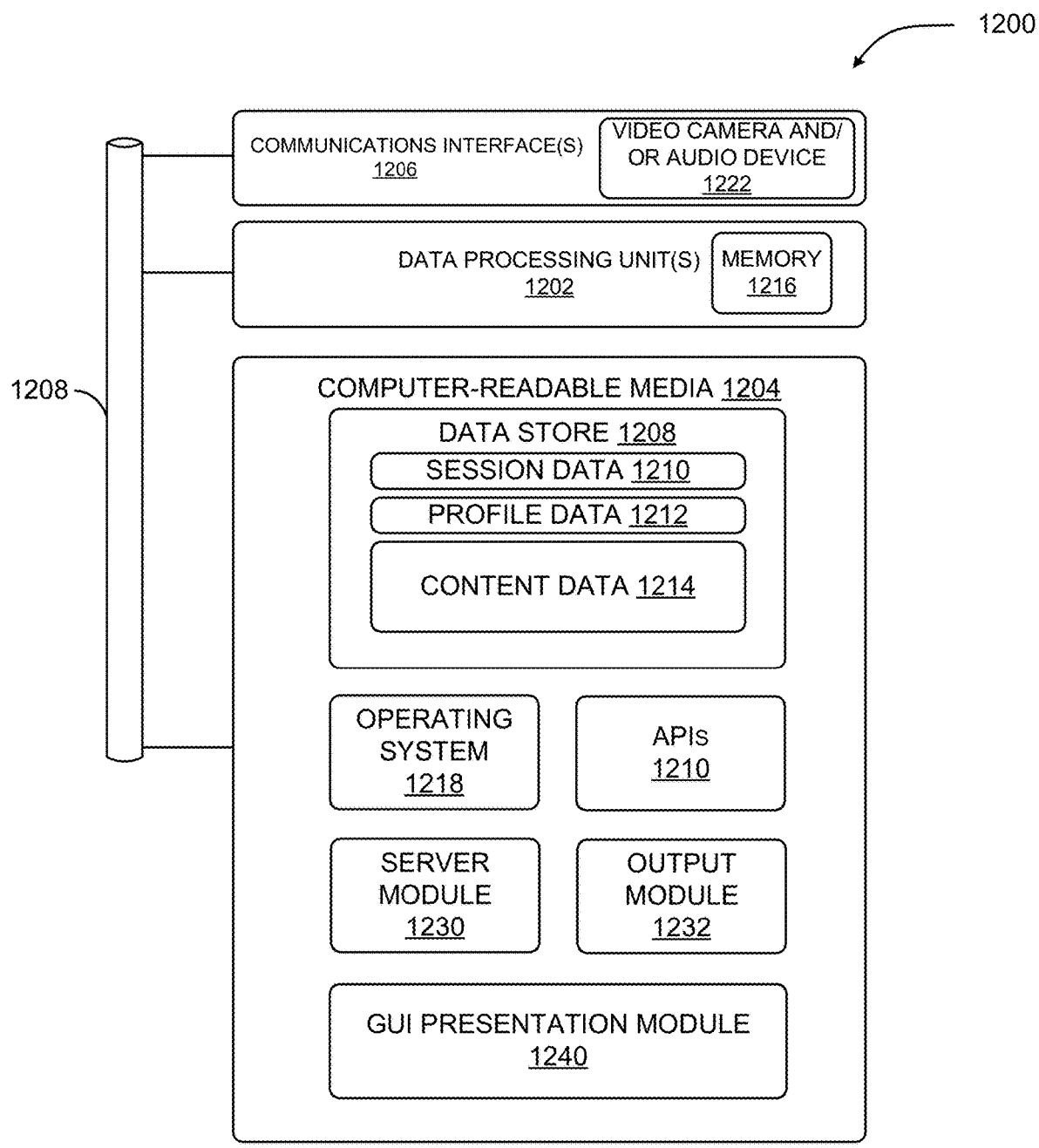
FIG. 12 is a computing architecture diagram showing aspects of the configuration and operation of a computing device that can implement aspects of the technologies disclosed herein.

FIG. 12 illustrates a diagram that shows example components of an example device 1200 configured to populate the HCI disclosed herein that may include one or more sections or grids that may render or comprise video, image, virtual objects 116, and/or content for display on the display screen 1128. The device 1200 may represent one of device(s) 102 or 104. Additionally, or alternatively, the device 1200 may represent one of the client computing devices 1106.

As illustrated, the device 1200 includes one or more data processing unit(s) 1202, computer-readable media 1204, and communication interface(s) 1206. The components of the device 1200 are operatively connected, for example, via a bus, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1182, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network. Furthermore, the communication interface(s) 1206 may include one or more video cameras and/or audio devices 1222 to enable generation of video feeds and/or still images, and so forth.

In the illustrated example, computer-readable media 1204 includes a data store 1208. In some examples, data store 1208 includes data storage such as a database, data warehouse, or other type of structured or unstructured data storage. In some examples, data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, data store 1208 may store session data 1210 (e.g., session data 836), profile data 1212 (e.g., associated with a participant profile), and/or other data. The session data 1210 can include a total number of participants (e.g., users and/or client computing devices) in a communication session, activity that occurs in the communication session, a list of invitees to the communication session, and/or other data related to when and how the communication session is conducted or hosted. The data store 1208 may also include content data 1214, such as the content 850 that includes video, audio, or other content for rendering and display on one or more of the display screens 828.

Alternately, some or all of the above-referenced data can be stored on separate memories 1216 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes operating system 1218 and application programming interface(s) 1210 (APIs) configured to expose the functionality and the data of the device 1200 to other devices. Additionally, the computer-readable media 1204 includes one or more modules such as the server module 1230, the output module 1232, and the GUI presentation module 1240, although the number of illustrated modules is just an example, and the number may vary higher or lower. That is, functionality described herein in association with the illustrated modules may be performed by a fewer number of modules or a larger number of modules on one device or spread across multiple devices.

Figure 13:
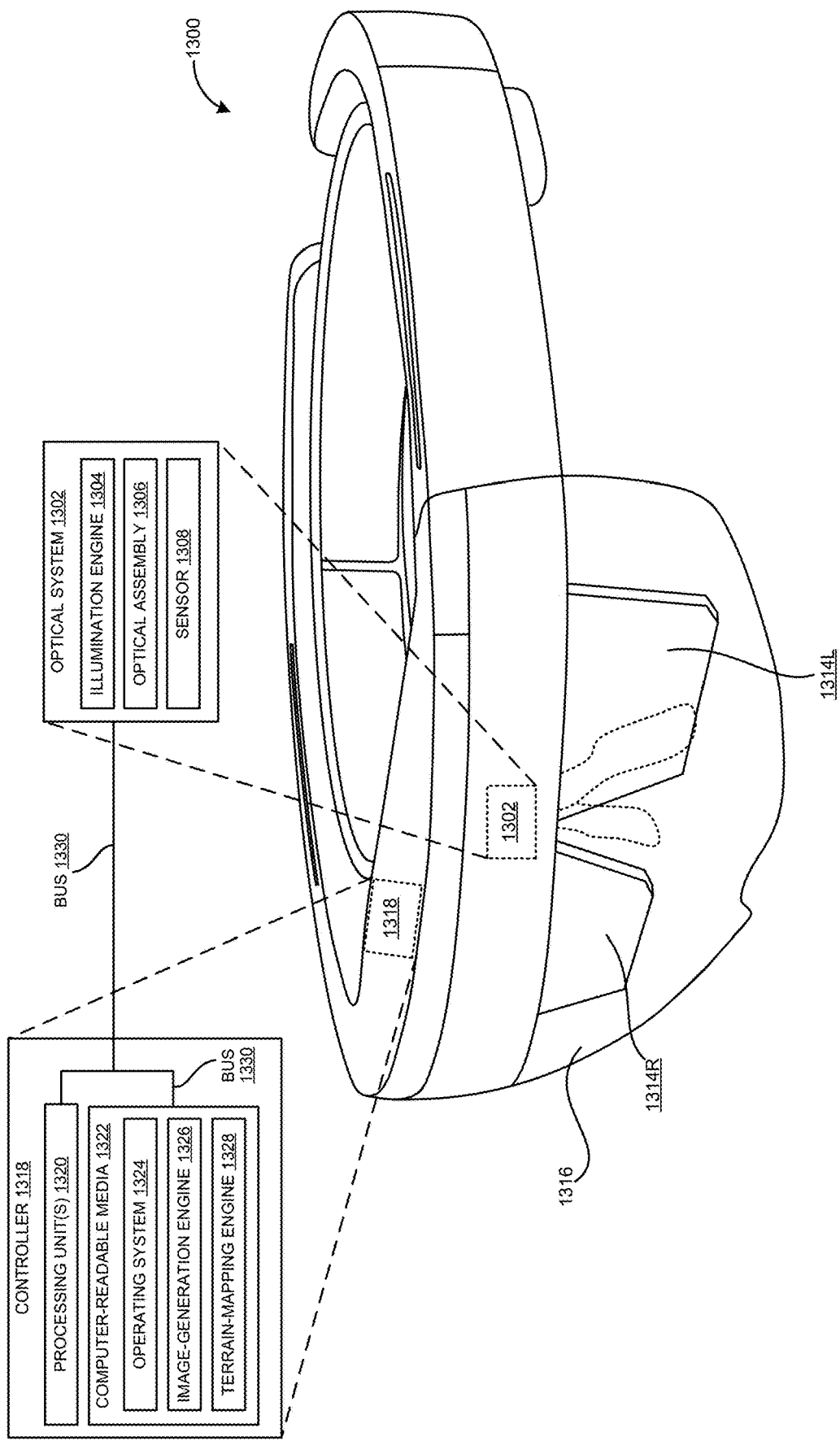
FIG. 13 is a computing device diagram showing aspects of the configuration and operation of an AR device that can implement aspects of the disclosed technologies, according to one embodiment disclosed herein.

FIG. 13 is a computing device diagram showing aspects of the configuration and operation of an AR device 1300 that can implement aspects of the systems disclosed herein. The AR device 1300 shows details of the computing device 102 shown in FIG. 0061. As described briefly above, AR devices superimpose CG images over a user's view of a real-world environment 112. For example, an AR device 1300 such as that shown in FIG. 13 might generate composite views to enable a user to visually perceive a CG image superimposed over a real-world environment 112. As also described above, the technologies disclosed herein can be utilized with AR devices such as that shown in FIG. 13, VR devices, MR devices, and other types of devices that utilize depth sensing.

In the example shown in FIG. 13, an optical system 1302 includes an illumination engine 1304 to generate electromagnetic ("EM") radiation that includes both a first bandwidth for generating CG images and a second bandwidth for tracking physical objects. The first bandwidth may include some or all of the visible-light portion of the EM spectrum whereas the second bandwidth may include any portion of the EM spectrum that is suitable to deploy a desired tracking protocol. In this example, the optical system 1302 further includes an optical assembly 1306 that is positioned to receive the EM radiation from the illumination engine 1304 and to direct the EM radiation (or individual bandwidths thereof) along one or more predetermined optical paths.

For example, the illumination engine 1304 may emit the EM radiation into the optical assembly 1306 along a common optical path that is shared by both the first bandwidth and the second bandwidth. The optical assembly 1306 may also include one or more optical components that are configured to separate the first bandwidth from the second bandwidth (e.g., by causing the first and second bandwidths to propagate along different image-generation and object-tracking optical paths, respectively).

In some instances, a user experience is dependent on the AR device 1300 accurately identifying characteristics of a physical object 110 or plane (such as the real-world floor) and then generating the CG image in accordance with these identified characteristics. For example, suppose that the AR device 1300 is programmed to generate a user perception that a virtual gaming character is running towards and ultimately jumping over a real-world structure. To achieve this user perception, the AR device 1300 might obtain detailed data defining features of the real-world environment 112 around the AR device 1300. In order to provide this functionality, the optical system 1302 of the AR device 1300 might include a laser line projector and a differential imaging camera in some embodiments.

In some examples, the AR device 1300 utilizes an optical system 1302 to generate a composite view (e.g., from a perspective of a user that is wearing the AR device 1300) that includes both one or more CG images and a view of at least a portion of the real-world environment 112. For example, the optical system 1302 might utilize various technologies such as, for example, AR technologies to generate composite views that include CG images superimposed over a real-world view. As such, the optical system 1302 might be configured to generate CG images via an optical assembly 1306 that includes a display panel 1314.

In the illustrated example, the display panel includes separate right eye and left eye transparent display panels, labeled 1314R and 1314L, respectively. In some examples, the display panel 1314 includes a single transparent display panel that is viewable with both eyes or a single transparent display panel that is viewable by a single eye only. Therefore, it can be appreciated that the techniques described herein might be deployed within a single-eye device (e.g. the GOOGLE GLASS AR device) and within a dual-eye device (e.g. the MICROSOFT HOLOLENS AR device).

Light received from the real-world environment 112 passes through the see-through display panel 1314 to the eye or eyes of the user. Graphical content computed by an image-generation engine 1326 executing on the processing units 1320 and displayed by right-eye and left-eye display panels, if configured as see-through display panels, might be used to visually augment or otherwise modify the real-world environment 112 viewed by the user through the see-through display panels 1314. In this configuration, the user is able to view virtual objects 116 that do not exist within the real-world environment 112 at the same time that the user views physical objects 110 within the real-world environment 112. This creates an illusion or appearance that the virtual objects 116 are physical objects 110 or physically present light-based effects located within the real-world environment 112.

In some examples, the display panel 1314 is a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the AR device 1300 further includes an additional see-through optical component, shown in FIG. 13 in the form of a transparent veil 1316 positioned between the real-world environment 112 and the display panel 1314. It can be appreciated that the transparent veil 1316 might be included in the AR device 1300 for purely aesthetic and/or protective purposes.

The AR device 1300 might further include various other components (not all of which are shown in FIG. 13), for example, front-facing cameras (e.g. red/green/blue ("RGB"), black & white ("B&W"), or infrared ("IR") cameras), speakers, microphones, accelerometers, gyroscopes, magnetometers, temperature sensors, touch sensors, biometric sensors, other image sensors, energy-storage components (e.g. battery), a communication facility, a global positioning system ("GPS") a receiver, a laser line projector, a differential imaging camera, and, potentially, other types of sensors. Data obtained from one or more sensors 1308, some of which are identified above, can be utilized to determine the orientation, location, and movement of the AR device 1300. As discussed above, data obtained from a differential imaging camera and a laser line projector, or other types of sensors, can also be utilized to generate a 3D depth map of the surrounding real-world environment 112.

In the illustrated example, the AR device 1300 includes one or more logic devices and one or more computer memory devices storing instructions executable by the logic device(s) to implement the functionality disclosed herein. In particular, a controller 1318 can include one or more processing units 1320, one or more computer-readable media 1322 for storing an operating system 1324, other programs (such as a 3D depth map generation module configured to generate the mesh data 106) in the manner disclosed herein), and data.

In some implementations, the AR device 1300 is configured to analyze data obtained by the sensors 1308 to perform feature-based tracking of an orientation of the AR device 1300. For example, in a scenario in which the object data includes an indication of a stationary physical object 110 within the real-world environment 112 (e.g., a table), the AR device 1300 might monitor a position of the stationary object within a terrain-mapping field-of-view ("FOV"). Then, based on changes in the position of the stationary object within the terrain-mapping FOV and a depth of the stationary object from the AR device 1300, a terrain-mapping engine executing on the processing units 1320 AR might calculate changes in the orientation of the AR device 1300.

It can be appreciated that these feature-based tracking techniques might be used to monitor changes in the orientation of the AR device 1300 for the purpose of monitoring an orientation of a user's head (e.g., under the presumption that the AR device 1300 is being properly worn by a user 118A). The computed orientation of the AR device 1300 can be utilized in various ways, some of which have been described above.

The processing unit(s) 1320, can represent, for example, a central processing unit ("CPU")-type processor, a graphics processing unit ("GPU")-type processing unit, an FPGA, one or more digital signal processors ("DSPs"), or other hardware logic components that might, in some instances, be driven by a CPU. For example, and without limitation, illustrative types of hardware logic components that can be used include ASICs, Application-Specific Standard Products ("ASSPs"), System-on-a-Chip Systems ("SOCs"), Complex Programmable Logic Devices ("CPLDs"), etc. The controller 1318 can also include one or more computer-readable media 1322, such as the computer-readable media described above.

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

It should be also appreciated that many variations and modifications may be made to the above-described examples, the elements of which are to be understood as being among other acceptable examples. All such modifications and variations are intended to be included herein within the scope of this disclosure and protected by the following claims.

EXAMPLE CLAUSES

The disclosure presented herein encompasses the subject matter set forth in the following example clauses.

Example A: A system comprising: one or more data processing units; and a computer-readable medium having encoded thereon computer-executable instructions to cause the one or more data processing units to receive data captured by one or more sensors of a computing device, the data comprising an image (108) of a real-world environment (112); generate a rendering of the image (108) in a user interface (UI) (114); receive a first input action (e.g., mouse down or finger down), the first input action defining a first location of a first point of a virtual object (116), the virtual object (116) being displayed as an overlay on the rendering of the image (108); receiving a second input action (e.g., mouse up/finger up) defining a second location of a second point of the virtual object (116), wherein the second point of the virtual object (116) is located at the second location; configuring an orientation and a size of the virtual object (116) based on a distance between the first location and the second location; and render the virtual object (116) in the UI (114).

Among many other technical benefits, the technologies herein enable more efficient use of computing resources such as processor cycles, memory, network bandwidth, and power, as compared to previous solutions relying upon inefficient manual placement of virtual objects in a 3D environment. Other technical benefits not specifically mentioned herein can also be realized through implementations of the disclosed subject matter.

Although the techniques have been described in language specific to structural features and/or methodological acts, it is to be understood that the appended claims are not necessarily limited to the features or acts described. Rather, the features and acts are described as example implementations of such techniques.

What is claimed is:

1. A system comprising:
   one or more data processing units; and
   a computer-readable medium having encoded thereon computer-executable instructions to cause the one or more data processing units to
   receive sensor data captured by one or more sensors of a computing device, the sensor data comprising an image of the real-world environment;
   render the image in a user interface (UI);
   receive input data indicating an input action and a position for a virtual object to be placed within the three-dimensional representation of the real-world environment;
   in response to determining that the input action meets one or more criteria, render the virtual object in the UI at the position within the three-dimensional representation of the real-world environment, wherein an orientation of the virtual object is based on the direction of movement indicated by an input device captured prior to the input action, wherein the input action meets the one or more criteria when a duration associated with the input action is less than a threshold amount of time, wherein the input action does not meet the one or more criteria when the duration exceeds the threshold amount of time; and
   in response to determining that the input action does not meet the one or more criteria, render the virtual object in the UI, wherein a first point of the virtual object is at the position, and a second point of the virtual object is located at a second position determined in response to a subsequent input action.

2. The system of claim 1, wherein the instructions further cause the one or more data processing units to:
   in response to determining that the input action does not meet the one or more criteria, monitor the input data indicating a movement indicated by the input device, wherein the movement indicated by the input device controls a movement of the second point of the virtual object; and
   modify a size of the virtual object based on a distance between the first point and the second point of the virtual object.

3. The system of claim 1, wherein the sensor data further comprises mesh data defining a three-dimensional representation of a real-world environment, and wherein the instructions further cause the one or more data processing units to:
   in response to determining that the input action meets the one or more criteria, determine a depth at the position within the three-dimensional representation of the real-world environment based on the mesh data; and
   determine a size parameter of the virtual object based upon the depth.

4. The system of claim 3, wherein the size parameter includes a length of the virtual object.

5. The system of claim 1, wherein the input action comprises a contact point between a user and a touch surface of the system, wherein the input action meets the one or more criteria when the contact point moves over a boundary that is a threshold distance from an initial contact point within the threshold amount of time.

6. The system of claim 5, wherein the input action further comprises detecting that the user stops making contact with the touch surface, wherein the position is based on a location where the user stopped making contact with the surface.

7. The system of claim 1, wherein the input action comprises a contact point between a user and a touch surface of the system, wherein the input action meets the one or more criteria when the contact point remains within a boundary that is a threshold distance from an initial contact point within the threshold amount of time.

8. The system of claim 7, wherein the input action comprises detecting that the user makes contact with the touch surface of the system, wherein the subsequent input action comprises detecting that the user has stopped making contact with the touch surface of the system.

9. The system of claim 1, wherein the duration is based on a first time that a button of the input device is activated to a second time that the button is deactivated, wherein the input action comprises activating the button and the subsequent input action comprises deactivating the button.

10. A system comprising:
    one or more data processing units; and
    a computer-readable medium having encoded thereon computer-executable instructions to cause the one or more data processing units to
    receive sensor data captured by one or more sensors of a computing device, the sensor data comprising mesh data defining a three-dimensional representation of a real-world environment and an image of the real-world environment;
    render the image in a user interface (UI);
    receive input data indicating a position for a virtual object to be placed within the three-dimensional representation of the real-world environment, wherein the position is selected in response to an input action;
    determine a direction of movement indicated by the input data, wherein the direction of movement is captured prior to the input action;
    in response to determining that the input action meets one or more criteria, render the virtual object in the UI at the position within the three-dimensional representation of the real-world environment, wherein an orientation of the virtual object is based on the direction of movement indicated by the input data, wherein the input action meets the one or more criteria when a duration associated with the input action is less than a threshold amount of time, wherein the input action does not meet the one or more criteria when the duration exceeds the threshold amount of time; and in response to determining that the input action does not meet the one or more criteria, render the virtual object in the UI, wherein a first point of the virtual object is at the position, and a second point of the virtual object is located at a second position determined in response to a subsequent input action.

11. The system of claim 10, wherein the instructions further cause the one or more data processing units to:
determine a depth at the position within the three-dimensional representation of the real-world environment based on a distance between a real-world object and the one or more sensors of the computing device; and
determine a size parameter of the virtual object based upon the depth.

12. The system of claim 10, wherein the input action involves receiving an input signal from a sensor tracking eye movement of a user to determine the position for the virtual object.

13. The system of claim 12, wherein the sensor generates the input data indicating the input action by a gesture performed by the user.

14. The system of claim 10, wherein the input action is a voice command captured by a microphone in communication with the system, wherein the voice command indicates the duration.

15. The system of claim 14, wherein the instructions further cause the one or more data processing units to:
determine content for an annotation based on the voice command; and
render the annotation in association with the virtual object.

16. A system comprising:
means for receiving sensor data captured by one or more sensors of a computing device, the sensor data comprising mesh data defining a three-dimensional representation of a real-world environment and an image of the real-world environment;
means for rendering the image in a user interface (UI);
means for receiving input data indicating a position for a virtual object to be placed within the three-dimensional representation of the real-world environment, wherein the position is selected in response to an input action;
means for determining a direction of movement indicated by the input data, wherein the direction of movement is captured prior to the input action;
means for rendering the virtual object in the UI at the position within the three-dimensional representation of the real-world environment, wherein an orientation of the virtual object is based on the direction of movement indicated by the input data, wherein the virtual object is rendered in response to determining that the input action meets one or more criteria, wherein the input action meets the one or more criteria when a duration associated with the input action is less than a threshold amount of time, wherein the input action does not meet the one or more criteria when the duration exceeds the threshold amount of time; and
means for rendering the virtual object in the UI in response to determining that the input action does not meet the one or more criteria, wherein a first point of the virtual object is at the position, and a second point of the virtual object is located at a second position determined in response to a subsequent input action.

17. The system of claim 16, wherein the instructions further cause the one or more data processing units to:
determine a depth at the position within the three-dimensional representation of the real-world environment based, at least in part, on the mesh data; and
determine a size of the virtual object based upon the depth.

18. The system of claim 16, wherein the input action is a voice command captured by a microphone in communication with the system, wherein the voice command indicates the duration.

19. The system of claim 16, wherein the duration is based on a first time that a button of an input device is activated to a second time that the button is deactivated, wherein the input action comprises activating the button and a subsequent action comprises deactivating the button.

20. The system of claim 3, wherein the depth is based on a distance between a real-world object and a sensor in communication with the system measuring the distance.

* * * * *